(12) United States Patent
Rosenflanz

(10) Patent No.: US 7,384,438 B1
(45) Date of Patent: *Jun. 10, 2008

(54) FUSED $AL_2O_3$-$Y_2O_3$-$ZRO_2$ EUTECTIC ABRASIVE PARTICLES, ABRASIVE ARTICLES, AND METHODS OF MAKING AND USING THE SAME

(75) Inventor: Anatoly Z. Rosenflanz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 533 days.

This patent is subject to a terminal disclaimer.

(21) Appl. No.: 09/618,876

(22) Filed: Jul. 19, 2000

(51) Int. Cl.
*B24D 3/00* (2006.01)
*C09K 3/14* (2006.01)

(52) U.S. Cl. .............................. 51/309; 51/307; 51/308; 51/295; 451/28

(58) Field of Classification Search .................... 51/307, 51/309, 295, 308; 501/126, 127, 153, 154; 501/105; 264/332; 451/28
See application file for complete search history.

(56) References Cited

U.S. PATENT DOCUMENTS

| | | | | |
|---|---|---|---|---|
| 659,926 | A | * | 10/1900 | Jacobs |
| 906,339 | A | * | 12/1908 | Tone |
| 960,712 | A | * | 6/1910 | Saunders |
| 1,037,999 | A | * | 9/1912 | Saunders |
| 1,107,011 | A | * | 8/1914 | Allen |
| 1,149,064 | A | * | 8/1915 | Kalmus |
| 1,161,620 | A | * | 11/1915 | Coulter |
| 1,192,709 | A | * | 7/1916 | Tone |
| 1,240,490 | A | * | 9/1917 | Saunders et al. |
| 1,247,337 | A | * | 11/1917 | Saunders et al. |
| 1,257,356 | A | * | 2/1918 | Hutchins |
| 1,263,708 | A | * | 4/1918 | Saunders et al. |
| 1,263,709 | A | * | 4/1918 | Saunders et al. |
| 1,263,710 | A | * | 4/1918 | Saunders et al. |
| 1,268,532 | A | | 6/1918 | Allen |
| 1,268,533 | A | | 6/1918 | Allen |
| 1,314,061 | A | | 8/1919 | Harrison |
| 1,339,344 | A | | 5/1920 | Hutchins |
| 1,402,714 | A | | 1/1922 | Brockbank |
| 1,448,586 | A | | 3/1923 | Allen |
| 1,910,444 | A | | 5/1933 | Nicholson |
| 2,000,857 | A | | 5/1935 | Masin |
| 2,424,645 | A | | 7/1947 | Baumann, Jr. et al. |
| 2,618,567 | A | | 11/1952 | Comstock, 3rd |
| 2,958,593 | A | | 11/1960 | Hoover et al. |
| 2,961,296 | A | | 11/1960 | Fenerty |
| 3,041,156 | A | | 6/1962 | Rowse et al. |
| 3,141,747 | A | | 7/1964 | Marshall |
| 3,181,939 | A | | 5/1965 | Marshall et al. |

(Continued)

FOREIGN PATENT DOCUMENTS

| | | |
|---|---|---|
| DE | 134 638 A | 3/1979 |
| EP | 0 480 678 A | 4/1992 |
| EP | 0 579 281 A1 | 1/1994 |
| EP | 0 647 601 A1 | 4/1995 |
| EP | 0 722 919 A1 | 7/1996 |
| JP | 59 22 7726 A | 12/1984 |
| JP | 06 040765 A | 2/1994 |
| JP | 10-208229 | 2/2000 |
| JP | 10-208244 | 2/2000 |
| WO | WO 00/34201 * | 6/2000 |

OTHER PUBLICATIONS

"Preliminary data on subsolidus phase equilibria in the $La_2O_3$–$Al_2O_3$–$Mn_2O_3$ and $La_2O_3$–$Al_2O_3$–$Fe_2O_3$ systems", Hrovat et al., *Journal of Materials Science Letters*, vol. 14, 1995, pp. 265–267 no month.*

"A New Ceramic Eutectic Composite with High Strength at 1873 K", Yoshiharu Waku, *Advanced Materials*, vol. 10, No. 8, 1998, pp. 615–627 no month.*

"Synthesis of Y–Al Garnet", Krokhin et al., *Glass and Ceramics*, vol. 55, Nos. 5–6, 1998, pp. 151–152 no month.*

"High–temperature strength and thermal stability of a unidirectionally solidified $Al_2O_3$/YAG eutectic composite", Waku et al. No Date.*

"Sapphire matrix composites reinforced with single crystal VAG phases", Waku et al., *Journal of Materials Science*, vol. 31, 1996, pp. 4663–4670 no month.*

"Thermo–Mechanical Stability Of Directionally Solidified $Al_2O_3$–$ZrO_2(Y_2O_3)$ Eutectic Fibers", Yang and Zhu, *Scripta Materialia*, vol. 36, No. 8, 1997, pp. 961–966 no month.*

"A ductile ceramic eutectic composite with high strength at 1,873 K", Waku et al., *Nature*, vol. 389, Sep. 1997, pp. 49–52.*

"The Liquidus Surface In The $Al_2O_3$–$ZrO_2$–$Y_2O_3$ Phase Diagram", Lakiza et al., *Powder Metallurgy and Metal Ceramics*, vol. 33, No. 11–12, 1994, pp. 595–597. No month.

"Powder–Material Research Methods And Properties Polythermal Sections Of The $Al_2O_3$–$ZrO_2$–$Y_2O_3$ Phase Diagram", Lakiza et al., *Powder Metallurgy and Metal Ceramics*, vol. 34, No. 11–12, 1995, pp. 655–659 no month.

"Metastable Phase Relationships In The System $Al_2O_3$–$ZrO_2$–$Y_2O_3$", *Powder Metallurgy and Metal Ceramics*, vol. 35, Nos. 11–12, 1996, pp. 621–626 no month.

"Solidus Surface And Phase Equilibria During The Solidification Of Alloys In The $Al_2O_3$–$ZrO_2$–$Y_2O_3$ System", Lakiza et al., *Powder Metallurgy and Metal Ceramics*, vol. 34, Nos. 1–2, 1995, pp. 64–67 no month.

"Methods of Investigation Of Properties Of Powder Materials, Interactions In The $Al_2O_3$–$ZrO_2$–$Y_2O_3$ System", Lakiza et al., *Powder Metallurgy and Metal Ceramics*, vol. 33, Nos. 9–10, 1994, pp. 486–490 no month.

(Continued)

*Primary Examiner*—Michael Marcheschi
(74) *Attorney, Agent, or Firm*—Gregory D. Allen

(57) ABSTRACT

Fused abrasive particles comprising eutectic material. The fused abrasive particles can be incorporated into abrasive products such as coated abrasives, bonded abrasives, nonwoven abrasives, and abrasive brushes.

80 Claims, 13 Drawing Sheets

U.S. PATENT DOCUMENTS

| | | | |
|---|---|---|---|
| 3,216,794 A | 11/1965 | Roschuk | |
| 3,377,660 A | 4/1968 | Marshall et al. | |
| 3,498,769 A | 3/1970 | Coes, Jr. | |
| 3,646,713 A | 3/1972 | Marshall et al. | |
| 3,726,621 A | 4/1973 | Cichy | |
| 3,781,172 A | 12/1973 | Pett et al. | |
| 3,792,553 A | 2/1974 | Schleifer et al. | |
| 3,881,282 A | 5/1975 | Watson | |
| 3,891,408 A | 6/1975 | Rowse et al. | |
| 3,893,826 A | 7/1975 | Quinan et al. | |
| 3,916,584 A | 11/1975 | Howard et al. | |
| 3,973,977 A | 8/1976 | Wilson | |
| 3,996,702 A | 12/1976 | Leahy | |
| 4,035,162 A | 7/1977 | Brothers et al. | |
| 4,049,397 A | 9/1977 | Bockstiegel et al. | |
| 4,059,417 A | 11/1977 | Ilmaier et al. | |
| 4,070,796 A | 1/1978 | Scott | |
| 4,073,096 A | 2/1978 | Ueltz et al. | |
| 4,111,668 A | 9/1978 | Walker et al. | |
| 4,126,429 A | 11/1978 | Watson | |
| 4,140,494 A | 2/1979 | Coes, Jr. | |
| 4,157,898 A | 6/1979 | Walker et al. | |
| 4,194,887 A | 3/1980 | Ueltz et al. | |
| 4,311,489 A | 1/1982 | Kressner | |
| 4,314,827 A | 2/1982 | Leitheiser et al. | |
| 4,341,533 A | 7/1982 | Daire et al. | |
| RE31,128 E | 1/1983 | Walker et al. | |
| 4,415,510 A | 11/1983 | Richmond | |
| 4,439,845 A | 3/1984 | Geohegan, Jr. et al. | |
| 4,457,767 A | 7/1984 | Poon et al. | |
| RE31,725 E | 11/1984 | Walker et al. | |
| 4,518,397 A | 5/1985 | Leitheiser et al. | |
| 4,543,107 A | 9/1985 | Rue | |
| 4,588,419 A | 5/1986 | Caul et al. | |
| 4,595,663 A * | 6/1986 | Krohn et al. | 501/104 |
| 4,623,364 A | 11/1986 | Cottringer et al. | |
| 4,652,275 A | 3/1987 | Bloecher et al. | |
| 4,734,104 A | 3/1988 | Broberg | |
| 4,737,163 A | 4/1988 | Larkey | |
| 4,741,743 A | 5/1988 | Narayanan et al. | |
| 4,744,802 A | 5/1988 | Schwabel | |
| 4,751,137 A | 6/1988 | Halg et al. | |
| 4,752,459 A | 6/1988 | Pepper | |
| 4,770,671 A | 9/1988 | Monroe et al. | |
| 4,780,268 A | 10/1988 | Papsi et al. | |
| 4,799,939 A | 1/1989 | Bloecher et al. | |
| 4,800,685 A | 1/1989 | Haynes, Jr. | |
| 4,881,951 A | 11/1989 | Wood et al. | |
| 4,898,587 A | 2/1990 | Mera | |
| 4,898,597 A | 2/1990 | Hay et al. | |
| 4,960,441 A | 10/1990 | Pellow et al. | |
| 4,997,461 A | 3/1991 | Markhof-Matheny et al. | |
| 5,009,675 A | 4/1991 | Kunz et al. | |
| 5,011,508 A | 4/1991 | Wald et al. | |
| 5,013,696 A | 5/1991 | Greskovich et al. | |
| 5,023,212 A | 6/1991 | Dubots et al. | |
| 5,038,453 A | 8/1991 | Kurita et al. | |
| 5,042,991 A | 8/1991 | Kunz et al. | |
| 5,085,671 A | 2/1992 | Martin et al. | |
| 5,090,968 A | 2/1992 | Pellow | |
| 5,094,672 A | 3/1992 | Giles, Jr. et al. | |
| 5,110,332 A | 5/1992 | Isaksson | |
| 5,118,326 A | 6/1992 | Lee et al. | |
| 5,131,926 A | 7/1992 | Rostoker et al. | |
| 5,139,978 A | 8/1992 | Wood | |
| 5,143,522 A | 9/1992 | Gibson et al. | |
| 5,152,917 A | 10/1992 | Pieper et al. | |
| 5,201,916 A | 4/1993 | Berg et al. | |
| 5,203,884 A | 4/1993 | Buchanan et al. | |
| 5,203,886 A | 4/1993 | Sheldon et al. | |
| 5,227,104 A | 7/1993 | Bauer | |
| 5,259,147 A | 11/1993 | Falz et al. | |
| 5,282,875 A | 2/1994 | Wood et al. | |
| 5,312,789 A | 5/1994 | Wood | |
| 5,336,280 A | 8/1994 | Dubots et al. | |
| 5,352,254 A | 10/1994 | Celikkaya | |
| 5,366,523 A | 11/1994 | Rowenhorst et al. | |
| 5,372,620 A | 12/1994 | Rowse et al. | |
| 5,376,470 A | 12/1994 | Sprouse | |
| 5,378,251 A | 1/1995 | Culler et al. | |
| 5,417,726 A | 5/1995 | Stout et al. | |
| 5,427,595 A | 6/1995 | Pihl et al. | |
| 5,429,647 A | 7/1995 | Larmie | |
| 5,431,704 A | 7/1995 | Tamamaki et al. | |
| 5,436,063 A | 7/1995 | Follett et al. | |
| 5,443,906 A | 8/1995 | Pihl et al. | |
| 5,496,386 A | 3/1996 | Broberg et al. | |
| 5,498,269 A | 3/1996 | Larmie | |
| 5,520,711 A | 5/1996 | Helmin | |
| 5,547,479 A | 8/1996 | Conwell et al. | |
| 5,549,962 A | 8/1996 | Holmes et al. | |
| 5,551,963 A | 9/1996 | Larmie | |
| 5,593,467 A | 1/1997 | Monroe | |
| 5,609,706 A | 3/1997 | Benedict et al. | |
| 5,651,925 A | 7/1997 | Ashley et al. | |
| 5,665,127 A | 9/1997 | Moltgen et al. | |
| 5,679,067 A | 10/1997 | Johnson et al. | |
| 5,725,162 A | 3/1998 | Garg et al. | |
| 5,738,696 A | 4/1998 | Wu | |
| 5,782,940 A | 7/1998 | Jayan et al. | |
| 5,863,308 A | 1/1999 | Qi et al. | |
| 5,876,470 A | 3/1999 | Abrahamson | |
| 5,902,763 A | 5/1999 | Waku et al. | |
| 5,906,951 A | 5/1999 | Ionta et al. | |
| 5,954,844 A | 9/1999 | Law et al. | |
| 5,961,674 A | 10/1999 | Gagliardi et al. | |
| 5,975,988 A | 11/1999 | Christianson | |
| 5,981,415 A * | 11/1999 | Waku et al. | 501/152 |
| 6,482,758 B1 | 11/2002 | Weber et al. | |

OTHER PUBLICATIONS

Figs. 311, 346, 350, 354–56, 373, and 716, *Phase Diagrams For Ceramists*, The American Ceramic Society, 1964, pp. 122, 136, 136, 140, 144, 248. No month.

Figs. 2340–44, 2363, 2370, 2374–75, 2382–83, 2385, 2387, 2390, and 2392, *Phase Diagrams For Ceramists, 1969 Supplement*, The American Ceramic Society, 1969, pp. 95–96, 100, 102–103, 105–108. No month.

Figs. 4366–71, 4377–78, 4404–05, 4417, 4426, 4430, 4433, 4437, 4440, 4444, 4457, 4572, and 4602, *Phase Diagrams For Ceramists, 1975 Supplement*, The American Ceramic Society, 1975, pp. 130–132, 135–136, 147, 152, 157, 159–160, 163–164, 166, 172–173, 238, 257. No month.

Figs. 5042, 5211, 5217, 5224, 5228, 5232, 5237, 5239, 5241, 5245, 5251, 5257, 5418, and 5437, *Phase Diagrams For Ceramists*, vol. IV, The American Ceramic Society, 1981, pp. 29, 125, 127, 129–131, 133, 135–137, 139, 141, 143, 220, 228. No month.

Fig. 6464, *Phase Diagrams For Ceramist*, vol. VI, The American Ceramic Society, 1981, p. 162. No month.

Figs. 9262, and 9264, *Phase Diagrams For Ceramists, vol. XI, Oxides*, The American Ceramic Society, 1995, pp. 105–106. No month.

"Phase Equilibria in the Yittrium Oxide–Alumina System", Toropov et al., *Bulletin of the Academy of Sciences, USSR, Division of Chemical Science*, No. 7, Jul., 1964, pp. 1076–1081, A translation of *Seriya Khimicheskaya*.

U.S. Patent Application entitled "Fused $Al_2O_3$–MgO–Rare Earth Oxide Eutectic Abrasive Particles, Abrasive Articles, And Methods Of Making And Using The Same", filed Jan. 30, 2001, Rosenflanz having Attorney Docket No. 55353USA8C.005.

Abstract for "Kinetics of Nonisothermal Sintering of Some Eutectic Oxide Compositions," I. Yu Volkova et al., 1986 (abstract from Database Chemabs Online! Chemical Abstracts Service, Columbus, Ohio, US). No month.

"Eutectic Precipitation of the Spinel Solid Solution–Yttrium Aluminum Garnet (YAG) System," Shuqiang Wang et al., *Journal of the American Ceramic Society*, 1998, vol. 81, No. 1, pp. 263–265. No month.

"Microstructures of laser–treated $Al_2O_3$–$ZrO_2$–$CeO_2$ composites," Zan–Hwey Chen et al., *Materials Science & Engineering A (Structural Materials: Properties, Microsructure and Processing)*, 1995, vol. A196, No. 1–2, pp. 253–260. No month.

"Advances in the Grinding Efficiency of Sintered Alumina Abrasives," Andreas Krell et al., *Journal of the American Ceramic Society*, 1996, vol. 79, No. 3, pp. 763–769. No month.

"Interface modification for increased fracture toughness in reaction–formed yttrium aluminum garnet/alumina eutectic composites," Luke N. Brewer et al., 1999, vol. 14, No. 10, pp. 3907–3912. No month.

Dow Jones Interactive Internet Printout on Jun. 20, 2001 for web address "http://ptg.djnr.com/ccroot/asp/publib/story.asp"; "China's Rare Earth Industry In the Doldrums", Asia Pulse, Jan. 28, 1999, 2 pages.

Dow Jones Interactive Internet Printout on Jun. 20, 2001 for web address "http://ptg.djnr.com/ccroot/asp/publib/story.asp", "China's Rare Earth Export Quota Set at 45,000 Tons", Asia Pulse, Jan. 9, 2001, 1 page.

Dow Jones Interactive Internet Printout on Jun. 20, 2001 for web address "http://ptg.djnr.com/ccroot/asp/publib/story.asp"; "ELEMENTS: China to Impose Quotas on Rare Earth Exports", Chemical Business NewsBase, Feb. 4, 1999, 1 page.

Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.

Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.

Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.

Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.

"China: Oversupply Puts Rare Earths Projects On Hold", Industrial Minerals, Aug., 1997, 1 page.

"Increase in Value of Rare Earth Products Boosts Yixing Xinwei", W. Yau, South China Morning Post, Apr. 12, 2000, 2 pages.

"Rare Earth—Market Confusion Inevitable Due to China's Unstable Supply", Japan Chemical Week, vol. 41, No. 2080, Jul. 6, 2000, pp. 6–7.

"Rare Earths Prices Recover Despite China's Overcapacity", Louise Rodriquez, America Metal Market, vol. 109, No. 14, Jan. 22, 2001, p. 13.

"Prices: Minerals", Asian Ceramics & Glass, Jan. 2001, 2 pages.

"China Rare Earth Information", China Rare Earth Information Center, vol. 6, No. 4, Aug. 2000, 3 pages.

"Microstructure and Thermal Stability of $Al_2O_3$/$Y_3Al_5O_{12}$ (YAG) Eutectic Composite Prepared by an Arc Discharge Method", T. Isobe et al., J. Ceram. Soc. Jap., 109, [1], 2001, pp. 66–70, Abstract in English. No month.

"Divorced Eutectic and Interface Characteristics in a Solidified YAG–Spinel Composite With Spinel–Rich Composition", S. Wang et al., J. Mat. Sc., 35, 2000, pp. 2757–2761. No month.

"Processing, Microstructure, and Strength of Alumina–YAG Eutectic Polycrystals", Tai–Il Mah et al., J. Am. Ceram. Soc., 83, [8], 2000, pp. 2088–2090. No month.

"Phase Identification of $Al_2O_3$/$RE_3Al_5O_{12}$ and $Al_2O_3$/$REAlO_3$ (RE=Sm–Lu, Y) Eutectics", J. Crystal Growth, 218, 2000, pp. 67–73. No month.

"Crystallization and Thermal Properties of $Al_2O_3$–$Y_2O_3$ Melts", S. V. Stankus et al., J. Crystal Growth, 167, 1996, pp. 165–170. No month.

Dialog (R) file 319: Chem Bus NewsBase (c) 2001 Royal Soc Chemistry. Abstract for "China: Oversupply Puts Rare Earths Projects On Hold", Industrial Minerals n 359, p. 10. No month.

"Rare–Earth Metals", J. Hedrick, pp. 61.1–61.6, 1997. No month.

"Rare–Earth Metal Prices in the USA ca. 1960 to 1994", J. Hedrick, J. Alloys and Compounds, 1997, pp. 471–481. No month.

U.S. Patent Application entitled, "Fused Abrasive Particles, Abrasive Articles, And Methods Of Making And Using The Same", filed Aug. 2, 2002, Anatoly Z. Rosenflanz, having U.S. Serial No. 10/211596.

"Abrasives", Kirk–Othmer Encyclopedia of Chemical Technology, Fourth Edition, vol. 1, page 17.

"Abrasives", Kirk–Othmer Encyclopedia of Chemical Technology, Fourth Edition, vol. 1, page 17. (no date).

Brewer et al., "Interface modification for increased fracture toughness in reaction–formed yttrium aluminum garnet/alumina eutectic composites," J. Mater Res., vol. 14, No. 10, Oct. 1999. pp. 3907–3912.

* cited by examiner

FUSED AL$_2$O$_3$-Y$_2$O$_3$-ZRO$_2$ EUTECTIC ABRASIVE PARTICLES, ABRASIVE ARTICLES, AND METHODS OF MAKING AND USING THE SAME

FIELD OF THE INVENTION

This invention pertains to fused abrasive particles and methods of making the same. The fused abrasive particles can be incorporated into a variety of abrasive articles, including bonded abrasives, coated abrasives, nonwoven abrasives, and abrasive brushes.

DESCRIPTION OF RELATED ART

There are a variety of abrasive particles (e.g., diamond particles, cubic boron nitride particles, fused abrasive particles, and sintered, ceramic abrasive particles (including sol-gel-derived abrasive particles) known in the art. In some abrading applications, the abrasive particles are used in loose form, while in others the particles are incorporated into abrasive products (e.g., coated abrasive products, bonded abrasive products, non-woven abrasive products, and abrasive brushes). Criteria used in selecting abrasive particles used for a particular abrading application include: abrading life, rate of cut, substrate surface finish, grinding efficiency, and product cost.

From about 1900 to about the mid-1980's, the premier abrasive particles for abrading applications such as those utilizing coated and bonded abrasive products were typically fused abrasive particles. There are two general types of fused abrasive particles: (1) fused alpha alumina abrasive particles (see, e.g., U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.)) and (2) fused (sometimes also referred to as "co-fused") alumina-zirconia abrasive particles (see, e.g., U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), and U.S. Pat. No. 5,143,522 (Gibson et al.))(also see, e.g., U.S. Pat. No. 5,023,212 (Dubots et. al) and U.S. Pat. No. 5,336,280 (Dubots et. al) which report the certain fused oxynitride abrasive particles). Fused alumina abrasive particles are typically made by charging a furnace with an alumina source such as aluminum ore or bauxite, as well as other desired additives, heating the material above its melting point, cooling the melt to provide a solidified mass, crushing the solidified mass into particles, and then screening and grading the particles to provide the desired abrasive particle size distribution. Fused alumina-zirconia abrasive particles are typically made in a similar manner, except the furnace is charged with both an alumina source and a zirconia source, and the melt is more rapidly cooled than the melt used to make fused alumina abrasive particles. For fused alumina-zirconia abrasive particles, the amount of alumina source is typically about 50–80 percent by weight, and the amount of zirconia, 50–20 percent by weight zirconia. The processes for making the fused alumina and fused alumina abrasive particles may include removal of impurities from the melt prior to the cooling step.

Although fused alpha alumina abrasive particles and fused alumina-zirconia abrasive particles are still widely used in abrading applications (including those utilizing coated and bonded abrasive products, the premier abrasive particles for many abrading applications since about the mid-1980's are sol-gel-derived alpha alumina particles (see, e.g., U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 4,960,441 (Pellow et al.), 5,139,978 (Wood), U.S. Pat. No. 5,201,916 (Berg et al.), U.S. Pat. No. 5,366,523 (Rowenhorst et al.), U.S. Pat. No. 5,429,647 (Larmie), U.S. Pat. No. 5,547,479 (Conwell et al.), U.S. Pat. No. 5,498,269 (Larmnie), U.S. Pat. No. 5,551,963 (Larmnie), and U.S. Pat. No. 5,725,162 (Garg et al.)).

The sol-gel-derived alpha alumina abrasive particles may have a microstructure made up of very fine alpha alumina crystallites, with or without the presence of secondary phases added. The grinding performance of the sol-gel derived abrasive particles on metal, as measured, for example, by life of abrasive products made with the abrasive particles was dramatically longer than such products made from conventional fused alumina abrasive particles.

Typically, the processes for making sol-gel-derived abrasive particles are more complicated and expensive than the processes for making conventional fused abrasive particles. In general, sol-gel-derived abrasive particles are typically made by preparing a dispersion or sol comprising water, alumina monohydrate (boehmite), and optionally peptizing agent (e.g., an acid such as nitric acid), gelling the dispersion, drying the gelled dispersion, crushing the dried dispersion into particles, screening the particles to provide the desired sized particles, calcining the particles to remove volatiles, sintering the calcined particles at a temperature below the melting point of alumina, and screening and grading the particles to provide the desired abrasive particle size distribution. Frequently a metal oxide modifier(s) is incorporated into the sintered abrasive particles to alter or otherwise modify the physical properties and/or microstructure of the sintered abrasive particles.

There are a variety of abrasive products (also referred to "abrasive articles") known in the art. Typically, abrasive products include binder and abrasive particles secured within the abrasive product by the binder. Examples of abrasive products include: coated abrasive products, bonded abrasive products, nonwoven abrasive products, and abrasive brushes.

Examples of bonded abrasive products include: grinding wheels, cutoff wheels, and honing stones). The main types of bonding systems used to make bonded abrasive products are: resinoid, vitrified, and metal. Resinoid bonded abrasives utilize an organic binder system (e.g., phenolic binder systems) to bond the abrasive particles together to form the shaped mass (see, e.g., U.S. Pat. No. 4,741,743 (Narayanan et al.), U.S. Pat. No. 4,800,685 (Haynes et al.), U.S. Pat. No. 5,038,453 (Narayanan et al.), and U.S. Pat. No. 5,110,332 (Narayanan et al.)). Another major type are vitrified wheels in which a glass binder system is used to bond the abrasive particles together mass (see, e.g., U.S. Pat. No. 4,543,107 (Rue), U.S. Pat. No. 4,898,587. (Hay et al.), U.S. Pat. No. 4,997,461 (Markhoff Matheny et al.), and U.S. Pat. No. 5,863,308 (Qi et al.)). These glass bonds are usually matured at temperatures between 900° C. to 1300° C. Today vitrified wheels utilize both fused alumina and sol-gel-derived abrasive particles. However, fused alumina-zirconia is generally not incorporated into vitrified wheels due in part to the thermal stability of alumina-zirconia. At the elevated temperatures at which the glass bonds are matured, the physical properties of alumina-zirconia degrade, leading to a significant decrease in their abrading performance. Metal bonded abrasive products typically utilize sintered or plated metal to bond the abrasive particles.

The abrasive industry continues to desire abrasive particles and abrasive products that are easier to make, cheaper to make, and/or provide performance advantage(s) over conventional abrasive particles and products.

SUMMARY OF THE INVENTION

The present invention provides a fused, crystalline abrasive particle comprising (preferably, at least 20, 30, 40, 50, 60, 70, 75, 80, 85, 90, 95, 98, 99, or 100 percent by volume, based on the total metal oxide volume of the particle) eutectic material, wherein the eutectic material comprises eutectic of at least (a) crystalline $ZrO_2$ and (b) at least two of (i) crystalline $Al_2O_3$, (ii) first crystalline complex $Al_2O_3.Y_2O_3$, or (iii) second, different (i.e., different from the first crystalline complex $Al_2O_3.Y_2O_3$), crystalline complex $Al_2O_3.Y_2O_3$. One preferred eutectic material comprises eutectic of at least (a) crystalline $ZrO_2$ (b) crystalline $Al_2O_3$, and (c) crystalline complex $Al_2O_3.Y_2O_3$. Another preferred eutectic material comprises eutectic of at least (a) crystalline $ZrO_2$, (b) first crystalline complex $Al_2O_3.Y_2O_3$, and (c) second, different, crystalline complex $Al_2O_3.Y_2O_3$.

In another aspect, the present invention provides a fused, crystalline abrasive particle comprising (preferably, at least 20, 30, 40, 50, 60, 70, 75, 80, 85, 90, 95, 98, 99, or 100 percent by volume, based on the total metal oxide volume of the particle) eutectic material, wherein the eutectic material comprises eutectic of at least (a) crystalline complex $Al_2O_3.Y_2O_3$ and (b) crystalline $ZrO_2$.

In another aspect, a fused, crystalline abrasive particle according to the present invention preferably comprises, on a theoretical oxide basis, at least 30 percent (or even at least 40, 50, 60, 70, or 80 percent) by weight $Al_2O_3$, based on the total metal oxide content the particle. A preferred crystalline complex $Al_2O_3.Y_2O_3$ is yttrium aluminate exhibiting a garnet crystal structure. A preferred eutectic is $Al_2O_3$—$Y_3Al_5O_{12}$—$ZrO_2$ eutectic.

In another aspect, the present invention provides a plurality of particles having a particle size distribution ranging from fine to coarse, wherein at least a portion of the plurality of particles are fused, crystalline abrasive particles according to the present invention.

In this application:

"simple metal oxide" refers to a metal oxide comprised of a one or more of the same metal element and oxygen (e.g., $Al_2O_3$, $CeO_2$, $MgO$, $SiO_2$, and $Y_2O_3$);

"complex metal oxide" refers to a metal oxide comprised of two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprised of, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprised of, on a theoretical oxide basis, $Al_2O_3$ and $Y_2O_3$ (e.g., $Y_3Al_{5O12}$);

"complex $Al_2O_3$.rare earth oxide" refers to a complex metal oxide comprised of, on a theoretical oxide basis, $Al_2O_3$ and rare earth oxide (e.g., $CeAl_{11}O_{18}$ and $Dy_3Al_{5O12}$);

"rare earth oxides" refer to, on a theoretical oxide basis, $CeO_2$, $Dy_{2O3}$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Th_4O_7$, $Tm_2O_3$, and $Yb_2O_3$; and "particle size" is the longest dimension of a particle.

In another aspect, the present invention provides a method for making fused, crystalline abrasive particles according to the present invention, the method comprising:

melting at least one $Al_2O_3$ source, at least one $Y_2O_3$ source, and at least one $ZrO_2$ source to provide a melt; and converting the melt to the fused, crystalline abrasive particles.

Fused abrasive particles according to the present invention can be incorporated into various abrasive products such as coated abrasives, bonded abrasives, nonwoven abrasives, and abrasive brushes.

The present invention also provides a method of abrading a surface, the method comprising:

contacting at least one fused abrasive particle according to the present invention (preferably, a plurality of fused abrasive particles according to the present invention) with a surface of a workpiece; and moving at least of one the fused abrasive particle according to the present invention or the surface relative to the other to abrade at least a portion of the surface with the fused abrasive particle according to the present invention.

Preferred fused abrasive particles according to the present invention provide superior grinding performance as compared to conventional fused abrasive particles. Preferred fused abrasive particles according to the present invention are sufficiently microstructurally and chemically stable to allow them to be used with vitrified bonding systems without the significant decrease in abrading performance of conventional fused alumina-zirconia abrasive particles used with vitrified bonding systems.

DETAILED DESCRIPTION

Figure 1:
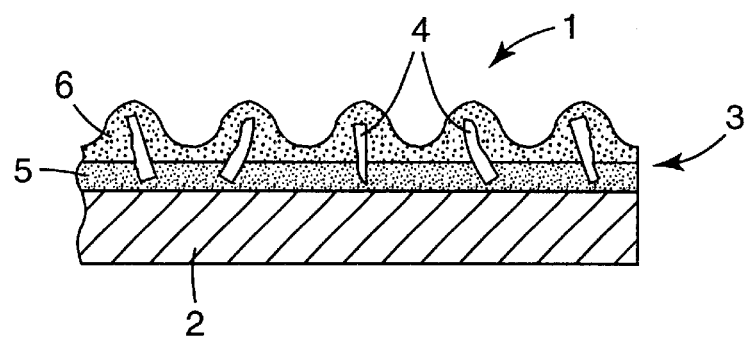
FIG. 1 is a fragmentary cross-sectional schematic view of a coated abrasive article including fused abrasive particles according to the present invention.

Fused abrasive particles according to the present invention can be made by heating the appropriate metal oxides sources to form a melt, preferably a homogenous melt, and then rapidly cooling the melt to provide a solidified mass. The solidified mass is typically crushed to produce the desired particle size distribution of abrasive particles.

More specifically, fused abrasive particles according to the present invention can be made by charging a furnace with sources of (on a theoretical oxide basis) $Al_2O_3$, $Y_2O_3$, $ZrO_2$, and other optional additives (e.g., other metal oxides and processing aids). The metal oxide sources can be added to the furnace, for example, together and melted, or sequentially and melted.

For solidified melt material containing complex metal oxide(s), at least a portion of the metal oxide present in the melted metal oxide sources (i.e., the melt) react to form complex metal oxide(s) during formation process of the solidified material. For example, an $Al_2O_3$ source and a $Y_2O_3$ source may react to form $Y_3Al_5O_{12}$ (i.e., $5Al_2O_3 + 3Y_2O_3 \rightarrow 2Y_3Al_5O_{12}$, $YAlO_3$ (i.e., $Al_2O_3 + Y_2O \rightarrow 2YAlO_3$), or $Y_4Al_2O_9$ (i.e., $Al_2O_3 + 2Y_2O_3 \rightarrow Y_4Al_2O_9$).

Depending upon the relative proportions of $Al_2O_3$, $Y_2O_3$, and $ZrO_2$ the resultant solidified material, and ultimately the fused abrasive particles, may comprise:

(a) crystalline $Al_2O_3$-complex $Al_2O_3$.metal oxide (complex $Al_2O_3$.metal oxide is, for example, $Y_3Al_5O_{12}$)—$ZrO_2$ eutectic and crystalline $Al_2O_3$; and/or (b) crystalline $Al_2O_3$-complex $Al_2O_3$.metal oxide (again complex $Al_2O_3$.metal oxide is, for example, $Y_3Al_5O_{12}$)—$ZrO_2$ eutectic;

(c) crystalline $Al_2O_3$-complex $Al_2O_3$.metal oxide (again complex $Al_2O_3$.metal oxide is, for example, $Y_3Al_5O_{12}$)—$ZrO_2$ eutectic and crystalline complex $Al_2O_3$.metal oxide (again, complex $Al_2O_3$.metal oxide is, for example, $Y_3Al_5O_{12}$); and/or (d) crystalline $Al_2O_3$-complex $Al_2O_3$.metal oxide (again, complex $Al_2O_3$.metal oxide is, for example, $Y_3Al_5O_{12}$)—$ZrO_2$ eutectic and crystalline $ZrO_2$.

If $Al_2O_3$ reacts with $Y_2O_3$ to form two complex metal oxides, the resulting solidified material, and ultimately the fused abrasive particles, depending upon the relative proportions of $Al_2O_3$ and $Y_2O_3$, may comprise:

(a) first crystalline complex $Al_2O_3$.metal oxide (e.g., $Y_3Al_5O_{12}$ or $YAlO_3$, respectively)-second, different (i.e., different than the first crystalline complex $Al_2O_3$.metal oxide), crystalline complex $Al_2O_3$.metal oxide (e.g., $YAlO_3$ or $Y_4Al_2O_9$, respectively)-$ZrO_2$ eutectic together with first crystalline complex $Al_2O_3$.metal oxide (again, e.g., $Y_3Al_5O_{12}$ or $YAlO_3$);

(b) first crystalline complex $Al_2O_3$.metal oxide (again, e.g., $Y_3Al_5O_{12}$ or $YAlO_3$)-second, different, crystalline complex $Al_2O_3$.metal oxide (again, e.g., $YAlO_3$ or $Y_4Al_2O_9$, respectively)-$ZrO_2$ eutectic;

(c) first crystalline complex $Al_2O_3$.metal oxide (again, e.g., $Y_3Al_5O_{12}$ or $YAlO_3$)-second, different, crystalline complex $Al_2O_3$.metal oxide (again, e.g., $YAlO_3$ or $Y_4Al_2O_9$, respectively)-$ZrO_2$ eutectic together with second, different, crystalline complex $Al_2O_3$.metal oxide (again, e.g., $YAlO_3$ or $Y_4Al_2O_9$); and/or (d) first crystalline complex $Al_2O_3$.metal oxide (again, e.g., $Y_3Al_5O_{12}$ or $YAlO_3$)-second, different, crystalline complex $Al_2O_3$.metal oxide (again, e.g., $YAlO_3$ or $Y_4Al_2O_9$, respectively)-$ZrO_2$ eutectic and crystalline $ZrO_2$.

Figure 4:
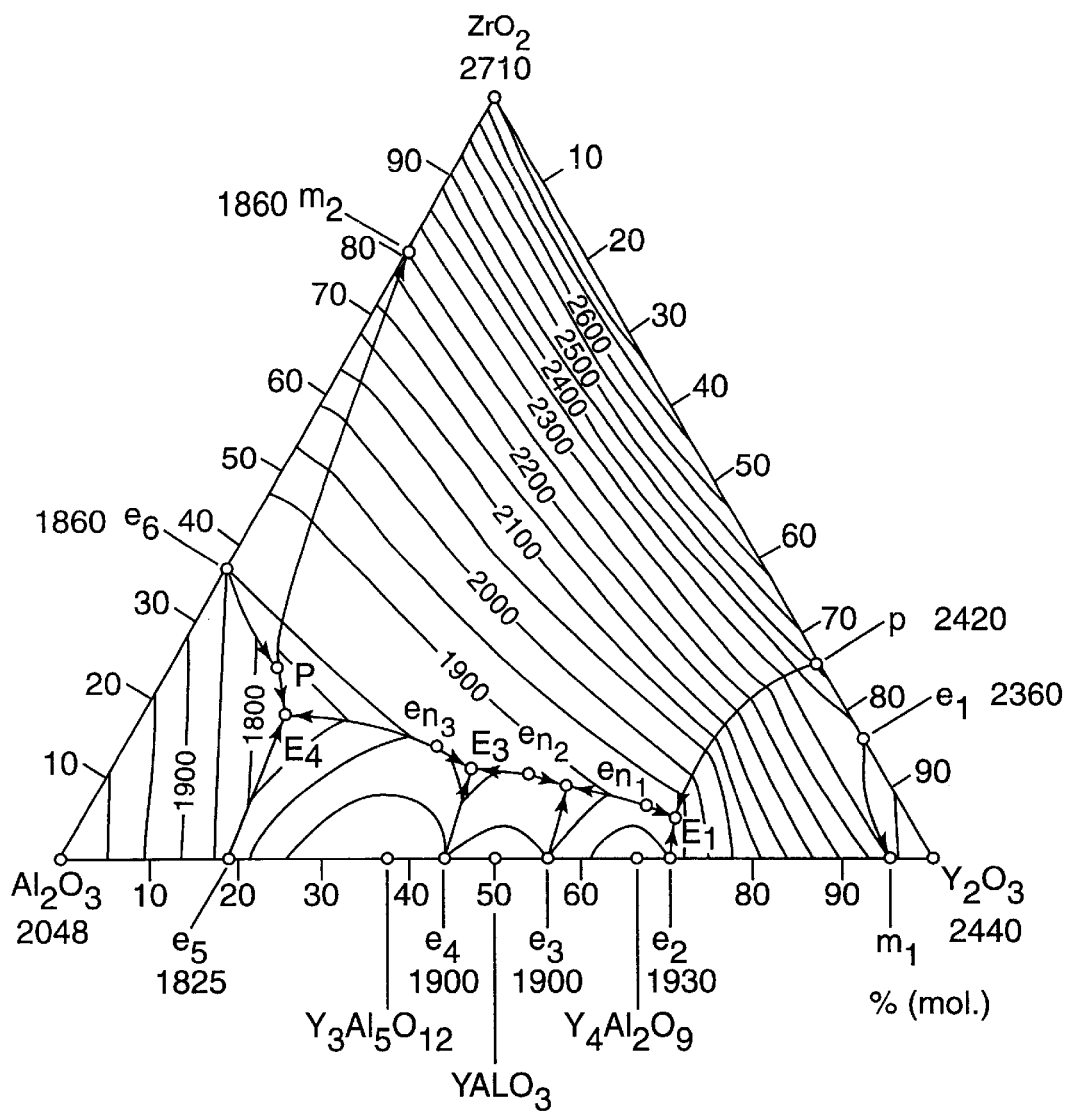
FIG. 4 is a projection of liquidus surface in the phase diagram for the $Al_2O_3$—$Y_2O_3$—$ZrO_2$ system on the plane of the concentration triangle.

It is understood, however, the particular phases formed are dependent upon several factors including the melt composition and solidification conditions. Typically it is preferred that the composition of the melt and the solidification conditions are such that a large portion of the resulting solidified material is occupied by eutectic (i.e., the formulation of the solidified material corresponds to close to eutectic proportions of the various metal oxide phases that present in the material). Exemplary eutectics for abrasive particles according to the present invention are shown, for example, in the ternary phase diagram in FIG. 4. More specifically, the diagram in FIG. 4 represents a projection of liquidus surface in the phase diagram for the $Al_2O_3$—$Y_2O_3$—$ZrO_2$ system on the plane of the concentration triangle. The preferred eutectic is the eutectic rich in $Al_2O_3$.

Although not wanting to be bound by theory, some metastable conditions during formation of the solidified material may lead to the formation of alternative eutectic. For example, if under normal, stable conditions the eutectic that forms is $Al_2O_3/Y_3Al_5O_{12}/ZrO_2$, under some metastable conditions $Al_2O_3/YAlO_3/ZrO_2$ eutectic may form in place of, or in addition to $Al_2O_3/Y_3Al_5O_{12}/ZrO_2$ eutectic.

It is also with in the scope of the present invention to substitute a portion of the yttrium and/or aluminum cations in the complex $Al_2O_3.Y_2O_3$ (e.g., yttrium aluminate exhibiting a garnet crystal structure) with other cations. For example, a portion of the Al cations in a complex $Al_2O_3.Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3.Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in alumina structure. The substitution of cations as described above may affect the properties (e.g. hardness, toughness, strength, thermal conductivity, etc.) of the abrasive particles.

Further, other eutectics will be apparent to those skilled in the art after reviewing the present disclosure. For example, phase diagrams depicting various eutectics are known in the art.

Fused abrasive particles according to the present invention containing eutectic material typically are comprised of eutectic colonies. An individual colony contains generally homogeneous microstructural characteristics (e.g., similar size and orientation of crystals of constituent phases within a colony). Typically, impurities, if present, in the fused, crystalline abrasive particles according to the present invention, tend to segregate to colony boundaries, and may be present alone and/or as reaction products (e.g., as a complex $Al_2O_3$.metal oxide and/or a complex $Y_2O_3$.metal oxide) as crystalline and/or amorphous (glass) phase(s).

In general, the phases making up the eutectic colonies include (a) single crystals of three different metal oxides (e.g., single crystals of each of $Al_2O_3$ $Y_3Al_5O_{12}$, and $ZrO_2$), (b) single crystals of two of the metal oxides (e.g., single crystal $Al_2O_3$ and single crystal $ZrO_2$) and a plurality of crystals of a different metal oxide (e.g., polycrystalline $Y_3Al_5O_{12}$), (c) a single crystal of one of the metal oxide (e.g., single crystal $Al_2O_3$ or $ZrO_2$) and a plurality of crystals of a different metal oxide (e.g., polycrystalline $Y_3Al_5O_{12}$ and polycrystalline $ZrO_2$), or (d) three different polycrystalline metal oxides (e.g., polycrystalline $Al_2O_3$, polycrystalline $Y_3Al_5O_{12}$, and polycrystalline $ZrO_2$).

The colonies may be in any of a variety of shapes, typically, ranging from essentially spherical to columnar. The composition, phase, and/or microstructure (e.g., crystallinity (i.e., single crystal or polycrystalline) and crystal size) of each colony may be the same or different. The orientation of the crystals inside the colonies may vary from one colony to another. The phases making up some eutectic colonies may be present in a variety of shapes such as, for example, rod or platelet-like to "chinese script"-like. Such differences between colonies may even be present between adjacent colonies.

The microstructure may also be a mixture of two constituent phases in a "chinese script" arrangement, with a third phase being present, for example, as rods or plates. Alternatively, for example, two constituent phases may be present as an interpenetrating network with a third phase present, for example, as plates or rods.

The number of colonies, their sizes and compositions are affected, for example, by the melt composition and solidification conditions. Although not wanting to be bound by theory, it is believed that the closer the melt composition is to the exact eutectic composition, the smaller the number of colonies that are formed. In another aspect, however, it is believed that slow, unidirectional solidification of the melt also tends to minimize the number of colonies formed, while multidirectional solidification with relatively higher cooling rates tends to increase the number of colonies formed. The solidification rate (i.e., cooling rate) of the melt and/or multidirectional solidification of the melt tend to affect the type and/or number of microstructural imperfections (e.g., pores) present in the resulting fused abrasive particles. For example, although not wanting to be bound by theory, relatively rapid solidification (i.e., solidification with relatively high cooling rates) and/or multidirectional solidification tend to lead to an increase in the type and/or number of microstructural imperfections (e.g., pores) present in the resulting fused abrasive particles. Relatively slow solidification, however, tends to lead to an increase in the size of the colonies, and/or crystals present in the solidified material; although it may be possible through slow and controlled cooling, for example, to eliminate formation of colonies. Hence, in selecting the cooling rate and/or degree of multidirectional solidification, there may be a need to increase or decrease the cooling rate to obtain the optimal balance of desirable and undesirable microstructural characteristics associated with the various cooling rates.

Further, for a given composition, the size of the colonies and phases present within the colonies tends to decrease as the cooling rate of the melt increases. Typically, the eutectic colonies in abrasive particles according to the present invention are, on average, less than 100 micrometers, preferably, less than 50 micrometers, wherein such size for a given colony is the average of the two largest dimensions measured from a polished cross-section of the colony, as viewed with a scanning electron microscope (SEM). Typically, the smallest dimension of the crystalline phases making up the eutectic in a colony, as measured from a polished cross-section of the colony viewed with an SEM, is up to 10 micrometers; preferably, up to 5 micrometers; more preferably, up to 1 micrometer, or even up to 0.5 micrometer.

Some abrasive particles according to the present invention also include primary crystals of at least one of the metal oxide phases making up the eutectic constituent of the abrasive particle. For example, if the eutectic portion is made up of a $Al_2O_3$ phase, a complex $Al_2O_3 \cdot Y_2O_3$ (e.g., $Y_3Al_5O_{12}$) phase, and $ZrO_2$ microstructure may also include primary crystals of $Al_2O_3$, the complex $Al_2O_3 \cdot Y_2O_3$, or $ZrO_2$, which is believed to occur when the composition of the melt from which the abrasive particles are formed is rich, on a theoretical oxide basis, in $Al_2O_3$, the complex $Al_2O_3 \cdot Y_2O_3$, or $ZrO_2$, respectively.

The formation of the primary crystals is believed to result from a deviation from the particular eutectic proportions. The greater the deviation, the larger the overall fraction of primary crystals. The primary crystals may be found in a variety of shapes, typically ranging from rod-like structures to dendritic-like structures. Although not wanting to be bound by theory, it is believed that the presence and/or formation of a primary crystal(s) adjacent to a colony may affect the resulting microstructure of the colony. In some cases it may be advantageous (e.g., for increased abrading performance) to have primary crystals (e.g., primary $Al_2O_3$ crystals) present in the abrasive particles. It is also believed, however, that the abrading performance of an abrasive particle tends to decrease as the size of the primary crystals increase.

Further, although not wanting to be bound by theory, it is believed that small additions (e.g., less than 5 percent by weight) of metal oxides other than those making up the eutectic may affect colony boundaries, and in turn affect properties (e.g., hardness and toughness) of the abrasive particle.

Sources of (on a theoretical oxide basis) $Al_2O_3$ for making abrasive particles according to the present invention include those known in the art for making conventional fused alumina and alumina-zirconia abrasive particles. Commercially available $Al_2O_3$ sources include bauxite (including both natural occurring bauxite and synthetically produced bauxite), calcined bauxite, hydrated aluminas (e.g., boehmite, and gibbsite), Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Y_3Al_5O_{12}$)).

Commercially available sources of (on a theoretical oxide basis) $Y_2O_3$ for making abrasive particles according to the present invention include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Commercially available sources of (on a theoretical oxide basis) $ZrO_2$ for making abrasive particles according to the present invention include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as haffnia.

Preferably, fused abrasive particles according to the present invention comprise, on a theoretical oxide basis, about 40 to about 90 mole % (more preferably, about 50 to about 80 mole %) $Al_2O_3$; about 5 to about 50 mole % (more preferably, about 10 to about 40 mole %) $ZrO_2$; and about 3 to about 30 mole % (more preferably, about 5 to about 20 mole %) $Y_2O_3$.

Optionally, fused abrasive particles according to the present invention further comprise other oxide metal oxides (i.e., metal oxides other than $Al_2O_3$, $Y_2O_3$, and $ZrO_2$). The addition of certain metal oxides may alter the crystalline structure or microstructure of the resulting fused abrasive particles. For example, although not wishing to be bound by any theory, it is theorized that certain metal oxides or metal oxide containing compounds (even when used in relatively small amounts, for example, even 0.01 to 5 percent by weight, based on the total metal oxide content of the fused abrasive particle) may be present at the boundaries between the eutectic colonies. The presence of these metal oxides, which may be in the form of reaction products together or with the $Al_2O_3$, $Y_2O_3$, and/or $ZrO_2$ may affect the fracture characteristics and/or microstructure of the fused abrasive particles, and/or may affect the grinding characteristics of the abrasive particles. The optional metal oxides may also act as a processing aid, for example, to increase the density of the fused abrasive particles, by decreasing the size and/or number of pores in the fused abrasive particles. The optional metal oxides may also act as a processing aid, for example, to increase or decrease the effective melting temperature of the melt. Thus certain metal oxides may be added for processing reasons.

Fused abrasive particles according to the present invention typically comprise less than 50 percent by weight (more typically, less than 20 percent by weight; in some cases in the range from 0.01 to 5 percent by weight, in other cases from 0.1 to 1 percent by weight) of metals oxides (on a theoretical oxide basis) other than alumina, yttria, and zirconia, based on the total metal oxide content of the respective abrasive particle. Sources of the other metal oxides are also readily commercially available.

Examples of optional metal oxides include, on a theoretical oxide basis, rare earth oxides, BaO, CaO, $Cr_2O_3$, CoO, $Fe_2O_3$, $HfO_2$, $Li_2O$, MgO, MnO, NiO, $SiO_2$, $TiO_2$, $Na_2O$, $Sc_2O_3$, SrO, $V_2O_3$, ZnO, and combinations thereof. Further with regard to rare earth oxides, commercially available sources of rare earth oxides for making abrasive particles according to the present invention include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other.than rare earth oxide(s) (including materials of or containing complex rare earth oxide other metal oxides (e.g., $Dy_3Al_5O_{12}$, $CeAl_{11}O_{18}$, etc.)).

Metal oxide sources for making abrasive particles according to the present invention also include fused abrasive particles (e.g., fused alumina abrasive particles) or other fused material (e.g., fused alumina material) having the same composition or different composition(s), which together with remaining metal oxide sources, provide the desired composition of the fused abrasive particles.

A reducing agent, such as a carbon source may be added to reduce impurities during the melting process. Examples of carbon sources include: coal, graphite, petroleum coke, or the like. Typically, the amount of carbon included in the charge to the furnace is up 5% by weight of the charge; more typically, up to 3% by weight, and more typically, up to 2% by weight. Iron may also be added to the furnace charge to aid in the removal of impurities. The iron can combine with the impurities to make a material that can be removed magnetically, for example, from the melt or crushed solidified material.

It is also within the scope of the present invention to include metal borides, carbides, nitrides, and combinations thereof in the fused, crystalline abrasive particles according to the present invention. Such materials may even be present within (e.g., as inclusions) the eutectic material. Examples of metal borides, carbides, and nitrides may include titanium diboride, aluminum carbide, aluminum nitride, titanium carbide, titanium nitride, silicon carbide, boron carbide, and boron nitride. Such materials are known in the art, and are commercially available.

The particular selection of metal oxide sources and other additives for making fused abrasive particles according to the present invention typically takes into account, for example, the desired composition and microstructure of the resulting abrasive particles, the desired physical properties (e.g., hardness or toughness) of the resulting abrasive particles, avoiding or minimizing the presence of undesirable impurities, the desired grinding characteristics of the resulting abrasive particles, and/or the particular process (including equipment and any purification of the raw materials before and/or during fusion and/or solidification) being used to prepare the abrasive particles.

The metal oxide sources and other additives can be in any form suitable to the process and equipment being used to make the abrasive particles. The raw materials can be fused using techniques and equipment known in the art for making conventional fused alumina and alumina-zirconia abrasive particles (see, e.g., U.S. Pat. No. 3,781,172 (Pett et al.), U.S. Pat, No. 3,891,408 (Rowse et al.), U.S. Pat. No. 4,035,162 (Brothers et al.), U.S. Pat, No. 4,070,796 (Scott), U.S. Pat, No. 4,073,096 (Ueltz et al.), U.S. Pat, No. 4,126,429 (Watson), U.S. Pat, No. 4,457,767 (Poon et al.), U.S. Pat, No. 5,143,522 (Gibson et al.), and U.S. Pat. No. Re. 31,128 (Walker et al.), the disclosures of which are incorporated herein by reference).

Examples of furnaces for melting the metal oxide sources and other additives include are furnaces, pig furnaces, are tapping furnaces, electric furnaces, electric are furnaces, and gas fired furnaces. Suitable electric furnaces include those in which the electrodes are arranged to create a "kissing are", wherein the lower tip of the electrodes are not in contact within the molten mass, as well as those in which the electrodes are submerged in the molten mass to provide resistance heating via current passing through the melt.

The furnace may have a lining (sometimes referred to as a "shell" or "skeleton") that covers the inside of the furnace walls. The lining may be made from a material dissimilar to the fused abrasive particle composition. Typically, however it is preferred that the furnace lining is made from a composition or material similar, sometimes nearly identical or identical to the composition of the fused abrasive particle.

Thus during processing, if the outer (exposed) surface of the lining melts, the potential contamination of the melt is reduced or minimized.

For some metal oxide sources and other additives, it may also be desirable to preheat feed prior to charging it into the furnace, or otherwise combining it with other metal oxide sources and other additives. For example, if carbonate, nitrate or other salts are used as the metal oxide source, it may be desirable to calcine (e.g., by heating them in air at about 400–1000° C.) such materials prior to adding them with the other metal oxide source materials.

Generally, the metal oxide sources and other additives, if present, are heated to a molten state, and mixed until the melt is homogenous. Typically, the melt is heated to and held at a temperature at least 50° C. (preferably, at least 1 00° C.) above the melting point of the melt. If the temperature of the melt is too low, the viscosity of the melt may be undesirably too high, making it more difficult to homogenize the various metal oxide sources and other additives making up the melt, or to pour or otherwise transfer the melt from the furnace. If the temperature of the melt is too high temperature, and/or the melt heated for too long, energy will be wasted, and there may be undesirable volatilization of components of the melt as well.

In some cases, it may be desirable, to mix, or otherwise blend the metal oxide sources and other additives (e.g., volatile components (e.g., water or organic solvent) which may assist in forming a homogenous mixture or blend), if present, together prior to forming the melt. For example, particulate metal oxide sources can be milled (e.g., ball milled) to both mix the materials together, as well as reduce the size of the particulate material. Other techniques for mixing or blending the metal oxide sources and other additives, if present, together prior to forming the melt include high shear mixers, paddle mixers, V-blenders, tumblers, and the like. Milling times may range from several minutes to several hours, or even days. Optionally, fugitive materials such as water and organic solvents may be removed from the mixture or blend of metal oxide sources and other additives, for example, by heating, prior to forming the melt. For ease of handling, the metal oxide sources and other additives may also be agglomerated prior to charging them to the furnace.

The atmosphere over the melt may be at atmospheric pressure, a pressure above atmospheric pressure, or a pressure below atmospheric pressure, although a pressure below atmospheric pressure may be preferred in order to reduce the number of pores in the resulting solidified material. The atmosphere over the melt may also be controlled to provide an oxidizing, reducing, or inert atmosphere which may affect the melt chemistry.

Reducing conditions during melting may aid in purifying the melt. In addition to, or alternatively to, adding a reducing agent to the melt, suitable reducing conditions may be obtained using carbon electrodes with an electric arc melting furnace. Under suitable reducing conditions, some impurities (e.g., silica, iron oxide, and titania) will convert to their respective molten metallic form, leading to a higher specific gravity for the melt. Such free metal(s) impurities would then tend to sink to the bottom of the furnace.

In another aspect, it may be desirable to oxidize free metal present in the melt before the melt is cooled (e.g., before pouring the melt from the furnace). For example, an oxygen lance(s) may be inserted into the melt just prior to pouring the melt from the furnace (see, e.g., U.S. Pat. No. 960,712, the disclosure of which is incorporated herein by reference).

The melt can be cooled using any of a variety of techniques known in the art. Typically the furnace containing the melt is capable of being tilted such that the melt can be poured over or into a heat sink. Examples of heat sinks include metallic balls (e.g., cast iron or carbon steel balls), metallic rods, metallic plates, metallic rolls, and the like. In some instances, these heat sink materials may be internally cooled (e.g., water-cooled or a suitable refrigerant) to achieve fast cooling rates. The heat sink material may also be pieces of pre-fused abrasive particles (having the same or a different composition being solidified) or other refractory material.

Further with regard to heat sinks, the melt can be cooled by pouring the melt over and in between a plurality of metallic balls. The balls typically range in diameter from about 1 to 50 cm, more typically 5 to 25 cm. The melt may also be cooled using book molds. Suitable book molds consist of a plurality of thin plates (e.g., metallic or graphite plates) that are spaced relatively close together. The plates are usually spaced less than 10 cm apart, typically less than 5 cm, and preferably less than 1 cm apart. The melt may also be poured into graphite or cast iron molds to form slabs. It is generally preferred that such "slabs" be relatively thin so as to achieve faster cooling rates.

The cooling rate is believed to affect the microstructure and physical properties of the solidified material, and thus the fused abrasive particles. Preferably, the melt is rapidly cooled as the size of the crystalline phases of the solidified material generally decreases as the cooling rate increase. Preferred cooling rates are at least 500° C./min.; more preferably, at least 1000° C./min; and even more preferably, at least 1500° C./min. The cooling rate may depend upon several factors including the chemistry of the melt, the melting point of the melt, the type of heat sink, and the heat sink material.

Rapid cooling may also be conducted under controlled atmospheres, such as a reducing, neutral, or oxidizing environment to maintain and/or influence the desired crystalline phases, oxidation states, etc. during cooling.

Additional details on cooling a melt can be found, for example, in U.S. Pat. No. Re 31,128 (Walker et al.), U.S. Pat, No. 3,781,172 (Pett et al.), U.S. Pat, No. 4,070,796 (Scott et al.), U.S. Pat, No. 4,194,887 (Ueltz et al.), U.S. Pat, No. 4,415,510 (Richmond), U.S. Pat, No. 4,439,845 (Richmond), and U.S. Pat, No. 5,143,522 (Gibson et al.), the disclosures of which are incorporated herein by reference.

The resulting (solidified) fused material(s) is typically larger in size than that desired for the abrasive particle(s). The fused material can be, and typically is, converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the molten material is solidified, it may be in the form of a relatively large mass structure (e.g., a diameter greater than 5 cm. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution.

The shape of fused abrasive particles according to the present invention depends, for example, on the composition and/or microstructure of the abrasive particles, the geometry in which it was cooled, and the manner in which the solidified material is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. Alternatively, abrasive particles may be directly formed into desired shapes by pouring or forming the melt into a mold.

The shape of the abrasive particles may be measured by various techniques known in the art, including bulk density and aspect ratio. The larger the abrasive particle size, the higher the bulk density due to the increased mass associated with larger particle sizes. Thus, when comparing bulk densities, the comparison should be made on abrasive particles having essentially the same particle size. In general, the larger the bulk density number, the "blockier" the abrasive particle is considered to be. Conversely the smaller the bulk density number, the "sharper" the abrasive particle is considered to be. Another way to measure sharpness is through an aspect ratio. The aspect ratio of a grade 36 for example, may range from about 1:1 to about 3:1, typically about 1.2:1 to about 2:1.

The bulk density of the abrasive particles can be measured in accordance with ANSI Standard B74.4-1992 (1992), the disclosure of which is incorporated herein by reference. In general, the bulk density is measured by pouring the abrasive particles sample through a funnel so that the abrasive particles traverses through the funnel in a free flowing manner. Immediately underneath the funnel is a collection device (typically a graduated cylinder). A predetermined volume of abrasive particles are collected and then weighed. The bulk density is calculated in terms of weight/volume.

Abrasive particles according to the present invention can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). Abrasive particles according to the present invention may be used in a wide range of particle sizes, typically ranging in size from about 0.1 to about 5000 micrometers, more typically from about 1 to about 2000 micrometers; preferably from about 5 to about 1500 micrometers, more preferably from about 100 to about 1500 micrometers.

In a given particle size distribution, there will be a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Preferred ANSI grades comprising abrasive particles according to the present invention are ANSI 8–220. FEPA grade designations include P8, P12, P16, P24, P36, P40, P50, P60, P80, P100, P120, P150, P180, P220, P320, P400, P500, P600, P800, P1000, and P1200. Preferred FEPA grades comprising abrasive particles according to the present invention are P12–P220. JIS grade designations include JIS8, JIS12, JIS16, JIS24, JIS36, JIS46, JIS54, JIS60, JIS80, JIS100, JIS150, JIS180, JIs220, JIS240, JIS280, JIS320, JIS360, JIS400, JIS400, JIS600, JIS800, JIS1000, JIS1500, JIS2500, JIS4000, JIS6000, JIS8000, and JIS10,000. Preferred JIS grades comprising abrasive particles according to the present invention are JIS8–220.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into the molten mass. This recycling may occur after the crushing step, where the particles are in large chunks or smaller pieces (sometimes referred to as "fines") that have not been screened to a particular distribution. A charge to the furnace for making fused abrasive particles according to the present invention may consist of anywhere from 0 to 100% by weight recycled fused abrasive particles, typically between 0 to 50% by weight.

Typically, the true density, sometimes referred to as specific gravity, of fused abrasive particles according to the present invention is typically at least 80% of theoretical density, although abrasive particles with a lower true density may also be useful in abrasive applications. Preferably, the true density of fused abrasive particles according to the present invention is at least 85% of theoretical density, more preferably at least 90% of theoretical density, and even more preferably at least 95% of theoretical density.

Typically, fused abrasive particles according to the present invention have an average hardness (i.e., resistance to deformation; also referred to as ("microhardness") of at least 11 GPa; preferably, at least 12, 13, or 14 GPa, more preferably, at least 15 GPa, and even more preferably, at least 16 GPa, at least 17 GPa, or even at least 18 GPa. In another aspect, fused abrasive particles according to the present invention typically have an average toughness (i.e., resistance to fracture) of at least 2.0 MPa m$^{1/2}$; preferably at least 2.5 MPa m$^{1/2}$, more preferably at least 3.0 MPa m$^{1/2}$, and even more preferably, at least 3.3 MPa m$^{1/2}$, at least 3.5 MPa m$^{1/2}$, or even at least 3.8 MPa m$^{1/2}$.

It is also within the scope of the present invention to provide a surface coating on the fused abrasive particles. Surface coatings are known, for example, to improve the adhesion between the abrasive particles and the binder material in the abrasive article. Such surface coatings are described, for example, in U.S. Pat. No. 1,910,444 (Nicholson), U.S. Pat. No. 3,041,156 (Rowse et al.), U.S. Pat. No. 4,997,461 (Markhoff-Matheny et al.), U.S. Pat. No. 5,009,675 (Kunz et al.), U.S. Pat. No. 5,042,991 (Kunz et al.), and U.S. Pat. No. 5,085,671 (Martin et al.), the disclosures of which are incorporated herein by reference. Further, in some instances, the addition of the coating improves the abrading characteristics of the abrasive particles. In another aspect, the surface coating may improve adhesion between the abrasive particle of the invention and the binder.

In another aspect, after the abrasive particles are produced, it may be further heat-treated to improve their physical properties and/or grinding performance. This heat-treating process may occur in an oxidizing atmosphere. Typically this heat-treating process occurs at a temperature between about 1100° C. to 1600° C., usually between 1200° C. to 1400° C. The time may range from about 1 minute to days, usually between about 5 minutes to 1 hour.

Other suitable preparation techniques for making fused abrasive particles according to the present invention may be apparent to those skilled in the art after reviewing the disclosure herein, as well as, for example, applications having U.S. Ser. Nos. 09/495,978, 09/496,422, 09/496,638, and 09/496,713, each filed on Feb. 2, 2000, and Ser. Nos 09/618,879, 09/619,106, 09/619,191, 09/619,192, 09/619,215, 09/619,289, 09/619,563, 09/619,729, 09/619,744, and 09/620,262 each filed on the same date as the instant application, the disclosure of which are all incorporated herein by reference.

For some fused abrasive particles according to the present invention, eutectic phases (e.g., $Al_2O_3$—$Y_3Al_5O_{12}$—$ZrO_2$) making up the colonies have a lamellar arrangement where one crystalline phase (e.g., alumina crystals) exhibit a trigonal shape. Further, the orientation of at least a portion adjacent lamellars (i.e. orientation of eutectic crystallization) follows the orientation of the trigonal (-shaped phase) outline at an angle of about 120 degrees. While not wishing to be bounded by theory, it is believed that during crystallization of the melt of a composition at or near ternary eutectic, primary crystals of one phase (e.g., alumina) may crystallize first as a seed in a trigonal shape. The consequent coupled growth of eutectic in the form of lamellar follows, at least initially, the orientation of the seed. A eutectic colony then includes seeds (e.g., alumina seeds) of the same orientation (or a single seed) together with the eutectic lamellar growth. Further, colony boundaries may not exhibit phase coarsening as has been observed in binary eutectics (manifested by the significant coarsening of crystals of eutectic phases in an immediate vicinity of colony boundary) such as was observed for Comparative Example A.

Preferred abrasive particles according to the present invention are thermally stable at elevated temperatures, as compared to conventional fused alumina-zirconia materials (including alumina-zirconia abrasive particles available from Norton Company, Worcester, Mass. under the trade designation "NORZON"). When alumina-zirconia eutectic abrasive particles available from Norton Company, Worcester, Mass. under the trade designation "NORZON, are heated in air, for example, to at least about 350° C., typically at least a portion of the zirconia undergoes a tetragonal and/or cubic to monoclinic phase transformation. This phase transformation is usually detrimental to the structural integrity of the alumina-zirconia material because it involves volume changes to the zirconia crystalline phases. Further, such phase transformations have been observed to occur preferentially at the boundaries of eutectic colonies, which thereby tend to weaken the boundaries, and which in turn tend to lead to significant degradation of mechanical properties (i.e., hardness, strength, etc.) of the material. In addition, various impurities, which are typically segregated during solidification of the melt into the eutectic colonies boundaries may also undergo volumetric structural changes (e.g., due to oxidation), leading to further degradation of mechanical properties (i.e., hardness, strength, etc.) of the material.

By contrast, it is believed that preferred abrasive particles according to the present invention typically do not exhibit phase transformations of the eutectic phases when heated up to 1000° C. (in some cases even up to 1400° C.) in air, and thus are thermally stable. Although not wishing to be bound by any theory, it is believed that this thermal stability allows such abrasive particle to be incorporated into vitrified bonded abrasives.

The thermal stability of certain preferred abrasive particles according to the present invention may be measured or illustrated using a variety of different techniques, including: Differential Thermal Analysis (DTA), Thermogravimetric Analysis (TGA), X-ray diffraction, hardness measurements, microstructure analysis, color change, and interaction with glass bonds. The thermal stability of the abrasive particles may be dependent, for example, upon the composition, particle chemistry, and processing conditions.

In one test for measuring the thermal stability of abrasive particles, the average hardness of the abrasive particles is measured before and after being heated in air at 1000° C. in air for 4 hours (see Comparative Example A (below) for a more complete description of the test). Although there may be some degradation of the average microhardness after being heated for 4 hours in air at 1000° C., the average hardness of preferred abrasive particles according to the present invention after being heated for 4 hours in air at 1000° C. are at least 85%, (preferably at least 90%, more preferably at least 95%, and even more preferably, about 100% or more) of the average microhardness of the abrasive particles prior to such heating.

The thermal stability of abrasive particles may also be observed using Scanning Electron Microscopy (SEM), wherein the average microstructure (e.g., porosity, crystal structure, colony size and crystal size (eutectic crystals, and primary crystals, if present) and integrity of the abrasive particles is examined before and after being heated at 1000° C. in air for 4 hours.

Further, the thermal stability of abrasive particles may also be illustrated by comparing the color of the abrasive particles before and after they are heated at 1000° C. in air for 4 hours. The microstructure of certain preferred abrasive particles according to the present invention is essentially the same before and after being heated at 1000° C. in air for 4 hours.

The thermal stability of abrasive particles may also be illustrated by comparing powder XRD result of the abrasive particles before and after they are heated at 1000° C. in air for 4 hours. As discussed above, when alumina-zirconia eutectic material is heated in air, typically at least a portion of the zirconia undergoes a tetragonal and/or cubic to monoclinic phase transformation. The effect of this phase transformation is typically significant enough to be observed via powder XRD. By contrast, the eutectic phases of certain preferred abrasive particles according to the present invention do not exhibit such phase transformations when heated to 1000° C. in air, hence no such transformation of the eutectic phases will be observed in the XRD results.

Fused abrasive particles according to the present invention can be used in conventional abrasive products, such as coated abrasive products, bonded abrasive products (including vitrified, resinoid, and metal bonded grinding wheels, cutoff wheels, mounted points, and honing stones), nonwoven abrasive products, and abrasive brushes. Typically, abrasive products (i.e., abrasive articles) include binder and abrasive particles, at least a portion of which is fused abrasive particles according to the present invention, secured within the abrasive product by the binder. Methods of making such abrasive products and using abrasive products are well known to those skilled in the art. Furthermore, fused abrasive particles according to the present invention can be used in abrasive applications that utilize loose abrasive particles, such as slurries of abrading compounds (e.g., polishing compounds), milling media, shot blast media, vibratory mill media, and the like.

Coated abrasive products generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive product.

An example of a coated abrasive product is depicted in FIG. 1. Referring to this figure, coated abrasive product 1 has a backing (substrate) 2 and abrasive layer 3. Abrasive layer 3 includes fused abrasive particles according to the present invention 4 secured to a major surface of backing 2 by make coat 5 and size coat 6. In some instances, a supersize coat (not shown) is used.

Bonded abrasive products typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive products typically comprise about 3–50% by volume bond material, about 30–90% by volume abrasive particles (or abrasive particle blends), up to 50% by volume additives (including grinding aids), and up to 70% by volume pores, based on the total volume of the bonded abrasive product.

Figure 2:
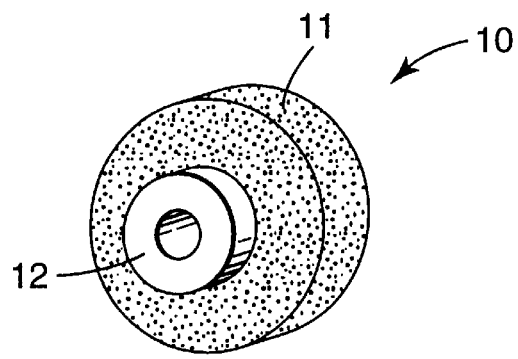
FIG. 2 is a perspective view of a bonded abrasive article including fused abrasive particles according to the present invention.

A preferred form is a grinding wheel. Referring to FIG. 2, grinding wheel 10 is depicted, which includes fused abrasive particles according to the present invention 11, molded in a wheel and mounted on hub 12.

Figure 3:
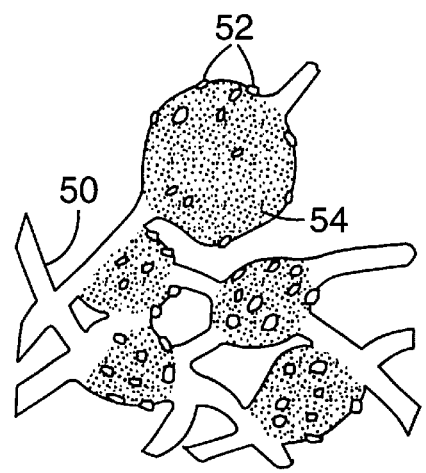
FIG. 3 is an enlarged schematic view of a nonwoven abrasive article including fused abrasive particles according to the present invention.

Nonwoven abrasive products typically include an open porous lofty polymer filament structure having fused abrasive particles according to the present invention distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 50 as a substrate, onto which fused abrasive particles according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Preferably, such brushes are made by injection molding a mixture of polymer and abrasive particles.

Suitable organic binders for making abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant c,-unsaturated carbonyl groups, epoxy resins, acrylated urethane, acrylated epoxies, and combinations thereof. The binder and/or abrasive product may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751,137 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive products according to the present invention may be in the shape of a wheel (including cut off wheels), honing stone, mounted pointed or other conventional bonded abrasive shape. A preferred vitrified bonded abrasive product according to the present invention is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in the range from about 700° C. to about 1500° C., usually in the range from about 800° C. to about 1300° C., sometimes in the range from about 900° C. to about 1200° C., or even in the range from about 950° C. to about 1 100° C. The actual temperature at which the bond is matured depends, for example, on the particular bond chemistry.

Preferred vitrified bonding materials may include those comprising silica, alumina (preferably, at least 10 percent by weight alumina), and boria (preferably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive product. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, and/or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Grinding aids can be particularly useful in coated abrasive and bonded abrasive products. In coated abrasive products, grinding aid is typically used in the supersize coat, which is applied over the surface of the abrasive particles. Sometimes, however, the grinding aid is added to the size coat. Typically, the amount of grinding aid incorporated into coated abrasive products are about 50–300 g/m$^2$ (preferably, about 80–160 g/m$^2$). In vitrified bonded abrasive products grinding aid is typically impregnated into the pores of the product.

The abrasive products can contain 100% fused abrasive particles according to the present invention, or blends of such abrasive particles with other abrasive particles and/or diluent particles. However, at least about 2% by weight, preferably at least about 5% by weight, and more preferably about 30–100% by weight, of the abrasive particles in the abrasive products should be abrasive particles according to the present invention. In some instances, the abrasive particles according the present invention may be blended with another abrasive particles and/or diluent particles at a ratio between 5 to 75% by weight, about 25 to 75% by weight, about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmnie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present invention, with the smaller sized particles being another abrasive particle type. Conversely, for example, the smaller sized abrasive particles may be abrasive particles according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Fused abrasive particles according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example,. in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles according to the present invention, and the second (outermost) layer comprises abrasive particles according to the present invention. Likewise in a bonded abrasive, there may be two distinct sections of the grinding wheel. The outermost section may comprise abrasive particles according to the present invention, whereas the innermost section does not. Alternatively, abrasive particles according to the present invention may be uniformly distributed throughout the bonded abrasive article.

Further details regarding coated abrasive products can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417, 726 (Stout et al.), U.S. Pat. No. 5,436,063 (Follett et al.), U.S. Pat. No. 5,496,386 (Broberg et al.), U.S. Pat. No. 5, 609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christinason), the disclosures of which are incorporated herein by reference. Further details regarding bonded abrasive products can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,038,453 (Narayanan et al.), U.S. Pat. No. 5,110,332 (Narayanan et al.), and U.S. Pat. No. 5,863,308 (Qi et al.) the disclosures of which are incorporated herein by reference. Further, details regarding vitreous bonded abrasives can be found, for example, in U.S. Pat. No. 4,543,107 (Rue), U.S. Pat. No. 4,898,597 (Hay), U.S. Pat. No. 4,997,461 (Markhoff-Matheny et al.), U.S. Pat. No. 5,094,672 (Giles et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive products can be found, for example, in U.S. Pat. No. 2,958,593 (Hoover et al.), the disclosure of which is incorporated herein by reference.

Methods for abrading with abrasive particles according to the present invention range from snagging (i.e., high pressure high stock removal) to polishing (e.g., polishing medical implants with coated abrasive belts), wherein the latter is typically done with finer grades (e.g., less ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles according to the present invention may be used to abrade workpieces such as aluminum metal, carbon steels, mild steels, tool steels, stainless steel, hardened steel, titanium, glass, ceramics, wood, wood-like materials, paint, painted surfaces, organic coated surfaces and the like. The applied force during abrading typically ranges from about 1 to about 100 kilograms.

EXAMPLES

This invention is further illustrated by the following examples, but the particular materials and amounts thereof recited in these examples, as well as other conditions and details, should not be construed to unduly limit this invention. Various modifications and alterations of the present invention will become apparent to those skilled in the art. All parts and percentages are by weight unless otherwise indicated.

Comparative Example A

A polyethylene bottle was charged with 187.2 grams of alumina powder (obtained under the trade designation "APA-0.5" from Condea Vista, Tucson, Ariz.), 112.9 grams of yttrium oxide powder (obtained from H.C. Starck, Newton, Mass.), 0.6 gram of a dispersing agent (obtained under the trade designation "DURAMAX D-30005" from Rohm and Haas Company, Dear Park, Tex.), and 100.4 grams of distilled water. The powders were present in amounts to provide 78.6 mole % $Al_2O_3$ and 21.4 mole % $Y_2O_3$. About 450 grams of alumina milling media (10 mm diameter; 99.9% alumina; obtained from Union Process, Akron, Ohio) were added to the bottle, and the mixture was milled for 4 hours to thoroughly mix the ingredients. After the milling, the milling media were removed and the slurry was poured onto a glass ("PYREX") pan where it was dried using a heat-gun held approximately 46 cm (18 inches) above the pan. The pan was slowly oscillated while drying to prevent the settling of the powder prior to complete drying. After drying with the heat-gun, the pan was placed in a drying oven for an additional 30 minutes at 90° C. to more completely dry the material. The dried powder bed was then scored with a spatula and scraped from the pan to form small flakes of material. Each flake weighed about 0.5 to 3 grams. The flakes were calcined in air by heating them to 670° C. at rate of about 1° C./min, and then holding them at 670° C. for 1 hour, after which the power to the furnace power was shut-off, and the furnace allowed to cool back to room temperature.

Several of the calcined flakes were melted in an arc discharge furnace (Model No. 1-VAMF-20-22-45; from Advanced Vacuum Systems, Ayer, Mass.). About 15 grams of the calcined flakes were placed on the chilled copper plate located inside a furnace chamber. The furnace chamber was evacuated and then backfilled with Argon gas at a 260 torr pressure. An arc was struck between an electrode and a plate. The temperatures generated by the arc discharge were high enough to quickly melt the calcined flakes. After melting was complete, the material was maintained in a molten state for about 30 seconds to homogenize the melt. The resultant melt was rapidly cooled by shutting off the arc and allowing the melt to cool on its own. Rapid cooling was ensured by small mass of a sample and a large heat sinking capability of a chilled copper plate. The fused material was removed from the furnace within one minute after the power to the furnace was turned off. Although not wanting to be bound by theory, it is estimated that the cooling rate of the melt on the surface of the water chilled copper plate was 1500° C./min. The fused material was white-green in color.

Figure 8:
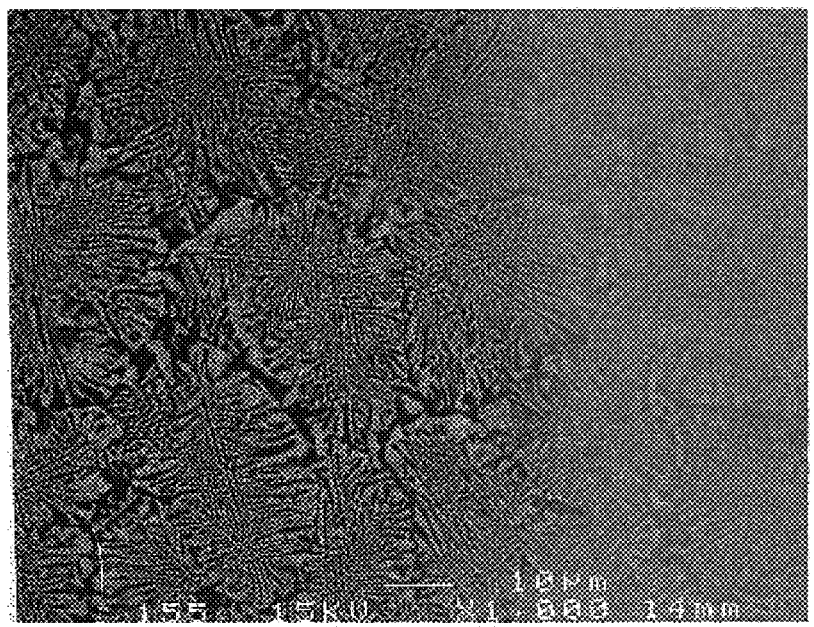
FIGS. 8 and 9 are scanning electron photomicrographs of polished cross-sections of Comparative Example A and E fused materials, respectively.

FIG. 8 is a scanning electron microscope (SEM) photomicrograph of a polished section of fused Comparative Example A material. The polished section was prepared using conventional mounting and polishing techniques. Polishing was done using a polisher (obtained from Buehler of Lake Bluff, EL under the trade designation "ECOMET 3 TYPE POLISHER-GRINDER"). The sample was polished for about 3 minutes with a diamond wheel, followed by three minutes of polishing with each of 45, 30, 15, 9, and 3 micrometer diamond slurries. The polished sample was coated with a thin layer of gold-palladium and viewed using JEOL SEM (Model JSM 840A). Referring again to FIG. 5, the photomicrograph shows a eutectic-derived microstructure comprising a plurality of colonies. The colonies were about 10–40 micrometers in size. Based on powder x-ray diffraction of a portion of Comparative Example A material, and examination of the polished sample using SEM in the backscattered mode, it is believed that the white portions in the photomicrograph were crystalline $Y_3Al_5O_{12}$, and the dark portions $\alpha$-$Al_2O_3$. The widths of these phases observed in the polished section were up to about 1 micrometer.

Comparative Example A fused material was crushed by using a "Chipmunk" jaw crusher (Type VD, manufactured by BICO Inc., Burbank, Calif.) into (abrasive) particles and graded to retain the −25+30 and −30+35 mesh fractions (USA Standard Testing Sieves). These two mesh fractions were combined to provide a 50/50 blend. Thirty grams of the 50/50 blend of −25+30 and −30+35 mesh fractions were incorporated into a coated abrasive disc. The coated abrasive disc was made according to conventional procedures. The fused abrasive particles were bonded to 17.8 cm diameter, 0.8 mm thick vulcanized fiber backings (having a 2.2 cm diameter center hole) using a conventional calcium carbonate-filled phenolic make resin (48% resole phenolic resin, 52% calcium carbonate, diluted to 81% solids with water and glycol ether) and a conventional cryolite-filled phenolic size resin (32% resole phenolic resin, 2% iron oxide, 66% cryolite, diluted to 78% solids with water and glycol ether). The wet make resin weight was about 185 g/m². Immediately after the make coat was applied, the fused abrasive particles were electrostatically coated. The make resin was precured for 120 minutes at 88° C. Then the cryolite-filled phenolic size coat was coated over the make coat and abrasive particles. The wet size weight was about 850 g/m². The size resin was cured for 12 hours at 99° C. The coated abrasive disc was flexed prior to testing.

The average microhardnesses of Comparative Example A abrasive particles were measured by mounting loose abrasive particles (about 10 mesh in size) in mounting resin (obtained under the trade designation "EPOMET" from Buehler Ltd., Lake Bluff, Ill.). The resulting cylinder of resin was about 2.5 cm (1 inch) in diameter and about 1.9 cm (0.75 inch) tall. The mounted samples were polished using a conventional grinder/polisher (obtained under the trade designation "EPOMET" from Buehler Ltd.) and conventional diamond slurries with the final polishing step using a 1 micrometer diamond slurry (obtained under the trade designation "METADI" from Buehler Ltd.) to obtain polished cross-sections of the sample.

The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The microhardness values were an average of 20 measurements. The average microhardness was 16.2 GPa.

Several Comparative Example A abrasive particles were heated placed in a platinum crucible and heated to 1000° C. at 50° C./hour, held at 1000° C. for 4 hours (in air), and then cooled to room temperature at about 100° C./hour. The color of the abrasive particles after heating was the same as before heating (i.e., white-green). The average microhardness of the abrasive particles after heating was 16.1 GPa. The polished cross-sections prepared for the microhardness measurements were examined using the SEM in the secondary electron mode. The microstructure observed after heating was substantially the same as the microstructure observed before heating.

Several Comparative Example A abrasive particles were also heated placed in a platinum crucible and heated to 1000° C. at 50° C./hour, held at 1000° C. for 8 hours (in air), and then cooled to room temperature at about 100° C./hour. The color of the abrasive particles after heating was the same as before heating (i.e., white-green). The average microhardness of the abrasive particles after heating was 16.0 GPa. The polished cross-sections prepared for the microhardness measurements were examined using the SEM in the secondary electron mode. The microstructure observed after heating was substantially the same as the microstructure observed before heating.

Comparative Example B

The Comparative Example B coated abrasive disc was prepared as described in Comparative Example A except heat-treated fused alumina abrasive particles (obtained under the trade designation "ALODUR BFRPL" from Triebacher, Villach, Austria) was used in place of the Comparative Example A fused abrasive particles.

Comparative Example C

The Comparative Example C coated abrasive disc was prepared as described in Comparative Example A except alumina-zirconia abrasive particles (having a eutectic composition of 53% $Al_2O_3$ and 47% $ZrO_2$; obtained under the trade designation "NORZON" from Norton Company, Worcester, Mass.) was used in place of the Comparative Example A fused abrasive particles.

The average microhardness of Comparative Example C abrasive particles was determined, as described above in Comparative Example A, to be 16.0 GPa. The color of the Comparative Example C abrasive particles was gray-navy blue.

Figure 11:
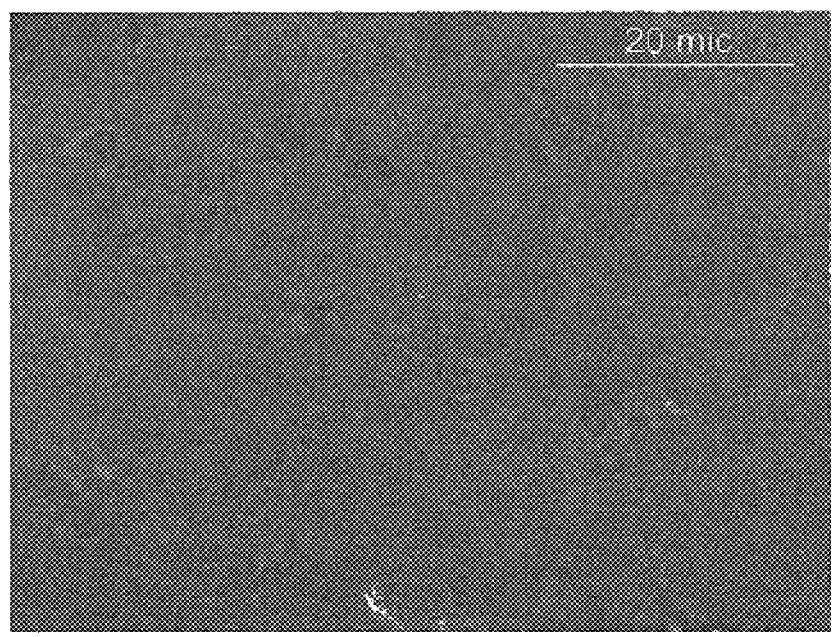
FIG. 11 a scanning electron photomicrograph of a polished cross-section of a Comparative Example C abrasive particle.
Figure 12:
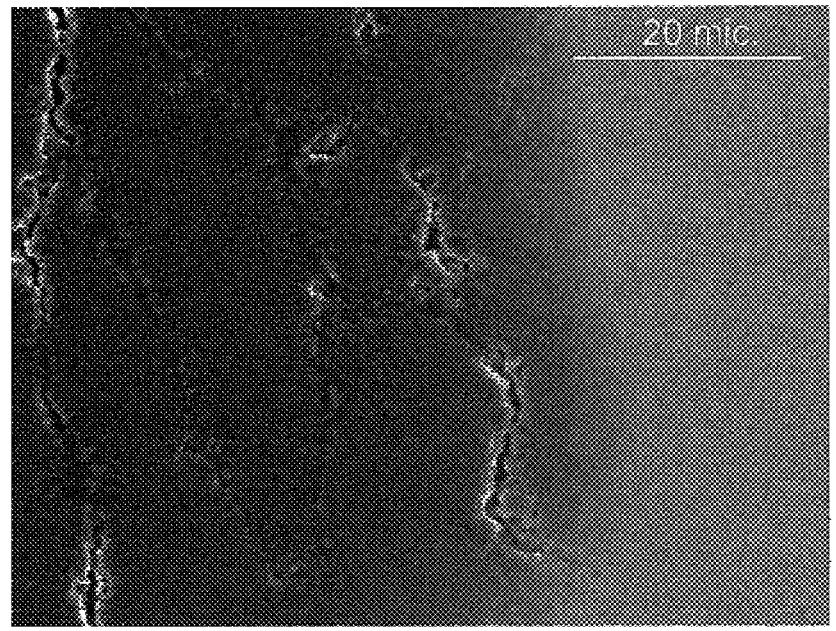
FIGS. 12 and 13 are scanning electron photomicrographs of polished cross-sections of Comparative Example C abrasive particles after exposure to various heating conditions.

Several Comparative Example C abrasive particles were heated placed in a platinum crucible and heated to 1000° C. at 50° C./hour, held at 1000° C. for 4 hours (in air), and then cooled to room temperature at about 100° C./hour. The color of the abrasive particles after heating was beige. The average microhardness of the abrasive particles after heating was 12.9 GPa. The polished cross-sections prepared for the microhardness measurements were examined using the SEM in the secondary electron mode. An SEM photomicrograph a Comparative Example C abrasive particle before heating is shown in FIG. 11. An SEM photomicrograph a Comparative Example C abrasive particle after heating is shown in FIG. 12. The microstructure observed after heating was different than that observed before heating. The differences were observed most predominately at the colony boundaries.

Further powder x-ray diffraction (using a Phillips XRG 3100 x-ray diffractometer with copper K α1 radiation of 1.54050 Angstrom) was used to qualitatively measure the phases present in Comparative Example C abrasive particles before and after the above described heat-treatment by comparing the peak intensities of 111 of cubic and/or tetragonal reflection at about 2θ=30 degrees, to that of 11$\bar{1}$ of monoclinic reflection at about 2θ=28 degrees. For reference see "Phase Analysis in Zirconia Systems," Garvie, R. C. and Nicholson, P. S., Journal of the American Ceramic Society, vol 55 (6), pp. 303–305, 1972, the disclosure of which is incorporated herein by reference. The samples were ground and −120 mesh powders used for analysis. The unheat-treated Comparative Example C abrasive particles contained both the monoclinic and cubic and/or tetragonal zirconia phases. For the heat-treated sample, a decrease in the cubic and/or tetragonal phase content with a corresponding increase in monoclinic phase content was observed.

Figure 13:
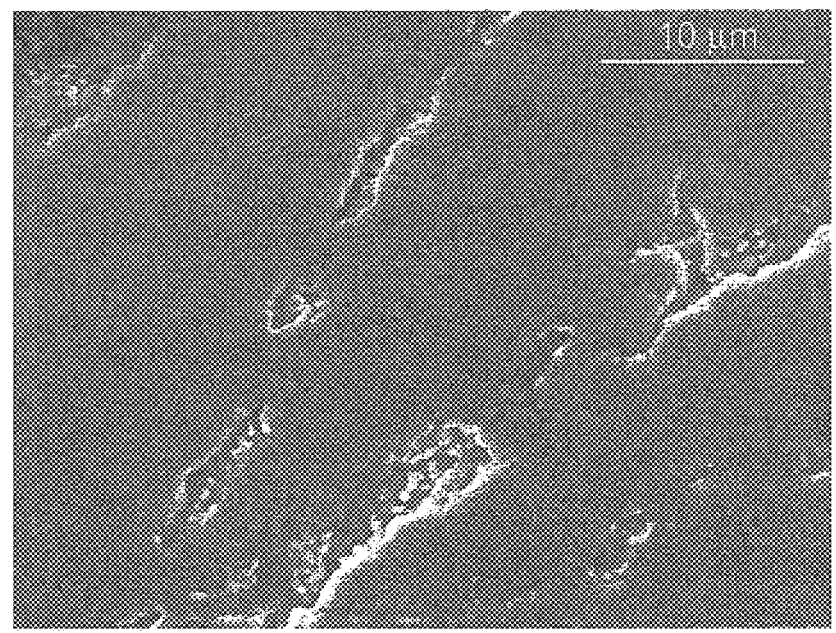

Several Comparative Example C abrasive particles were heated placed in a platinum crucible and heated to 1000° C. at 50° C./hour, held at 1000° C. for 8 hours (in air), and then cooled to room temperature at about 100° C./hour. The color of the abrasive particles after heating was beige. The average microhardness of the abrasive particles after heating was 12.8 GPa. The polished cross-sections prepared for the microhardness measurements were examined using the SEM in the secondary electron mode. An SEM photomicrograph a Comparative Example C abrasive particle after heating is shown in FIG. 13. The microstructure observed after heating was different than that observed before heating. The differences, which were greater than those observed for the heat-treatment at 1000° C. for 4 hours, were again observed most predominately at the colony boundaries.

Figure 14:
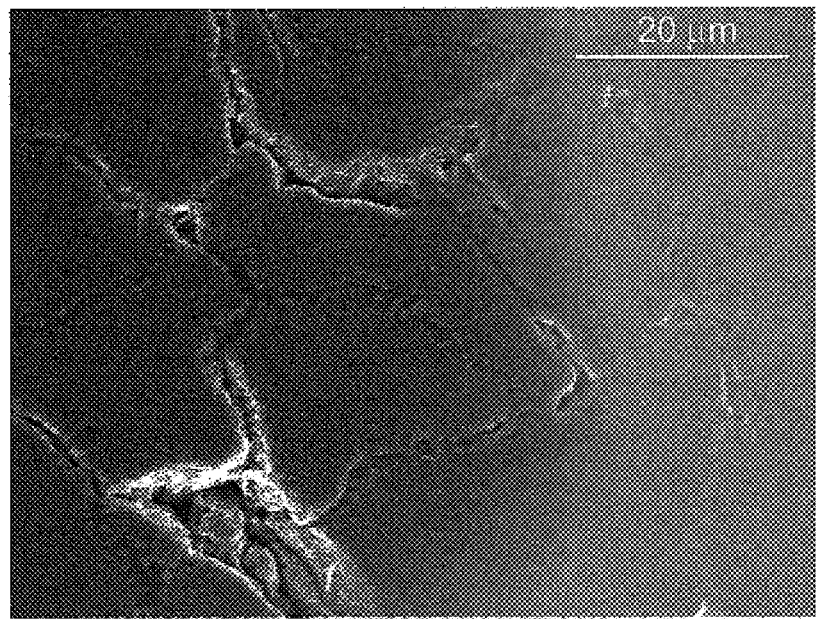
FIG. 14 is a scanning electron photomicrograph of a polished cross-section of Comparative Example C abrasive particles after exposure to vitrified bonding material.

The effect of two vitrified bonding materials on Comparative Example C abrasive particles were evaluated as follows. A first vitrified bond material was prepared by charging a plastic jar (4⅜ inches (11.1 cm) in diameter; 4⅜ inches (11.1 cm) in height) with 70 parts of a glass frit (37.9% $SiO_2$, 28.5% $B_2O_3$, 15.6% $Al_2O_3$, 13.9% $Na_2O$, and 4.1% $K_2O$; obtained under the trade designation "FERRO FRIT 3227" from Ferro Corporation, Cleveland, Ohio), 27 parts of Kentucky Ball Clay (No 6DC; obtained from Old Hickory Clay Company, Hickory, Ky.), 3.5 parts of $Li_2CO_3$ (obtained from Alfa Aesar Chemical Company, Ward Hill, Mass.), 3 parts $CaSiO_3$ (obtained from Alfa Aesar Chemical Company), and 625 grams of 1.3 cm (0.5 inch) diameter plastic coated steel media, and then dry milling the contents at 90 rpm for 7 hours. The composition was formulated to provide a vitrified bond material comprising about 45% $SiO_2$, about 19% $Al_2O_3$, about 20% $B_2O_3$, about 10% $Na_2O$, about 3% $K_2O$, about 1.5% $Li_2O$, and about 1.5% CaO. The dry milled material and Comparative Example C abrasive particles were pressed into a 3.2 cm×0.6 cm (1.25 inch×0.25 inch) pellet. The pellet was heated to 1000° C. at 50° C./hour, held at 1000° C. for 8 hours (in air), and then cooled to room temperature at about 100° C./hour. The pellet was prepared by mixing, in order, 20 parts of Comparative Example C abrasive particles (−20+30 mesh), 0.24 part of hydrolyzed starch (obtained under the trade designation "DEXTRIN" from Aldrich Chemical Company, Milwaukee, Wis.), 0.02 part glycerine (obtained from Aldrich Chemical Company), 0.72 part water, 3.14 parts of the dry milled material, and 0.4 part of hydrolyzed starch ("DEXTRIN"). The pellet was pressed under a load of 2273 kilograms (5000 lbs.). The average microhardness of the abrasive particles after heating in the vitrified bonding material was 13.6 GPa, although some of the Comparative Example C abrasive particles exhibit such severe degradation that microhardness measurements could not be effectively made (portions of the particles were too weak). There was variability in the color of the heat-treated abrasive particles, although the majority of the particles were beige. The polished cross-sections prepared for the microhardness measurements were examined using the SEM in the secondary electron mode. An SEM photomicrograph a Comparative Example C abrasive particle after heating is shown in FIG. 14. The microstructure observed after heating was different than that observed before heating. The differences, which were greater than those observed for the heat-treatment at 1000° C. for 4 hours, were again observed most predominately at the colony boundaries.

A second vitrified bond material was prepared by charging a plastic jar (4⅜ inches (11.1 cm) in diameter; 4⅜ inches (11.1 cm) in height) with 45 parts of Kentucky Ball Clay (No. 6DC; obtained from Old Hickory Clay Company), 28 parts of anhydrous sodium tetraborate (obtained from Alfa Aesar Chemical Company), 25 parts of feldspar (obtained under the trade designation "G-200 Feldspar" from Feldspar Corporation, Atlanta, Ga.), 3.5 parts of $Li_2CO_3$ (obtained from Alfa Aesar Chemical Company), 2.5 parts of $CaSiO_3$ (obtained from Alfa Aesar Chemical Company), and 625 grams of 1.3 cm (0.5 inch) diameter plastic coated steel media, and then dry milling the contents at 90 rpm for 7 hours. The composition was formulated to provide a vitrified bond material comprising about 45% $SiO_2$, about 19% $Al_2O_3$, about 20% $B_2O_3$, about 10% $Na_2O$, about 3% $K_2O$, about 1.5% $Li_2O$, and about 1.5% CaO. The dry milled material and Comparative Example C abrasive particles were pressed into a 3.2 cm×0.6 cm (1.25 inch×0.25 inch) pellet. The pellet was heated to 1000° C. at 50° C./hour, held at 1000° C. for 8 hours (in air), and then cooled to room temperature at about 100° C./hour. The pellet was prepared by mixing, in order, 20 parts of Comparative Example C abrasive particles (−20+30 mesh), 0.24 part of hydrolyzed starch (obtained under the trade designation "DEXTRIN" from Aldrich Chemical Company, Milwaukee, Wis.), 0.02 part glycerine (obtained from Aldrich Chemical Company), 0.72 part water, 3.14 parts of the dry milled material, and 0.4 part of hydrolyzed starch ("DEXTRIN"). The pellet was pressed under a load of 2273 kilograms (5000 lbs.). The average microhardness of the abrasive particles after heating in the vitrified bonding material was 13.4 GPa, although some of the Comparative Example C abrasive particles exhibit such severe degradation that microhardness measurements could not be effectively made (portions of the particles were too weak). There was variability in the color of the heat-treated abrasive particles, although the majority of the particles were beige. The polished cross-sections prepared for the microhardness measurements were examined using the SEM in the secondary electron mode. The microstructure observed after heating was different than that observed before heating. The differences, which were greater than those observed for the heat-treatment at 1000° C. for 4 hours, were again observed most predominately at the colony boundaries.

Comparative Example D

The Comparative Example D coated abrasive disc was prepared as described in Comparative Example A except sol-gel-derived abrasive particles (commercially available under the trade designation "321 CUBITRON" from the 3M Company, St. Paul, Minn.) was used in place of the Comparative Example A fused abrasive particles.

Grinding Performance of Comparative Examples A–D

The grinding performance of Comparative Examples A–D coated abrasive discs were evaluated as follows. Each coated abrasive disc was mounted on a beveled aluminum back-up pad, and used to grind the face of a pre-weighed 1.25 cm×18 cm×10 cm 1018 mild steel workpiece. The disc was driven at 5,000 rpm while the portion of the disc overlaying the beveled edge of the back-up pad contacted the workpiece at a load of 8.6 kilograms. Each disc was used to grind individual workpiece in sequence for one-minute intervals. The total cut was the sum of the amount of material removed from the workpieces throughout the test period. The total cut by each sample after 12 minutes of grinding as well as the cut at 12th minute (i.e., the final cut) are reported in Table 1, below.

TABLE 1

| Example | Total cut, g | Final cut, g |
|---|---|---|
| Comp. A | 732 | 56 |
| Comp. B | 418 | 23 |
| Comp. C | 621 | 48 |
| Comp. D | 859 | 75 |

Comparative Example E

Comparative Example E fused material and abrasive particles were prepared as described in Comparative Example A, except (a) the polyethylene bottle was charged with 173 grams of alumina powder ("APA-0.5"), 19.3 grams of magnesium oxide powder (obtained under the trade designation "MAGCHEM 10–325" from Martin Marietta Magnesia Specialties, Hunt Valley, Md.), 107.8 grams of yttrium oxide powder obtained from H.C. Starck, Newton, Mass.), 0.6 gram of a dispersing agent ("DURAMAX D-30005"), and 137.4 grams of distilled water, and (b) the powders were present in amounts to provide 64 mole % $Al_2O_3$, 18 mole % MgO, and 18 mole % $Y_2O_3$. The fused material was white in color.

Figure 9:
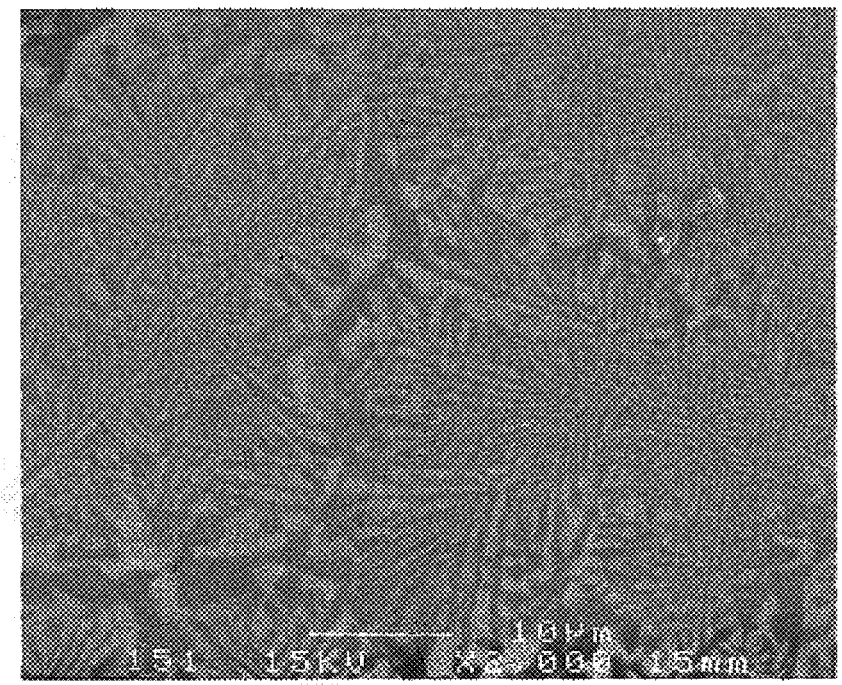

FIG. 9 is a scanning electron microscope (SEM) photomicrograph of a polished section (prepared as described in Comparative Example A) of fused Comparative Example E material. The photomicrograph shows a eutectic-derived microstructure comprising a plurality of colonies. The colonies are about 10–40 micrometers in size. Based on powder x-ray diffraction of a portion of Comparative Example E material, and examination of the polished sample using SEM in the backscattered mode, it is believed that the white portions in the photomicrograph were crystalline $Y_3Al_5O_{12}$, and the dark portions a crystalline $Al_2O_3$-rich spinel solid solution phase. The width of these phases observed in the polished section were up to about 1 micrometer.

Comparative Example F

Comparative Example F fused material and abrasive particles were prepared as described in Comparative Example A, except (a) the polyethylene bottle was charged with 149.5 grams of alumina powder ("APA-0.5"), 149.4 grams of yttria-stabilized zirconia oxide powder (with a nominal composition of 94 wt % $ZrO_2$ (+$HfO_2$) and 5.4 wt % $Y_2O_3$; obtained under the trade designation "HSY 3.0" from Zirconia Sales, Inc. of Marietta, GA), 0.6 gram of a dispersing agent ("DURAMAX D-30005"), and 136.5 grams of distilled water, and (b) the powders were present in amounts to provide 54.8 mole % $Al_2O_3$ and 45.2 mole % $ZrO_2$. The fused material was white in color.

Figure 10:
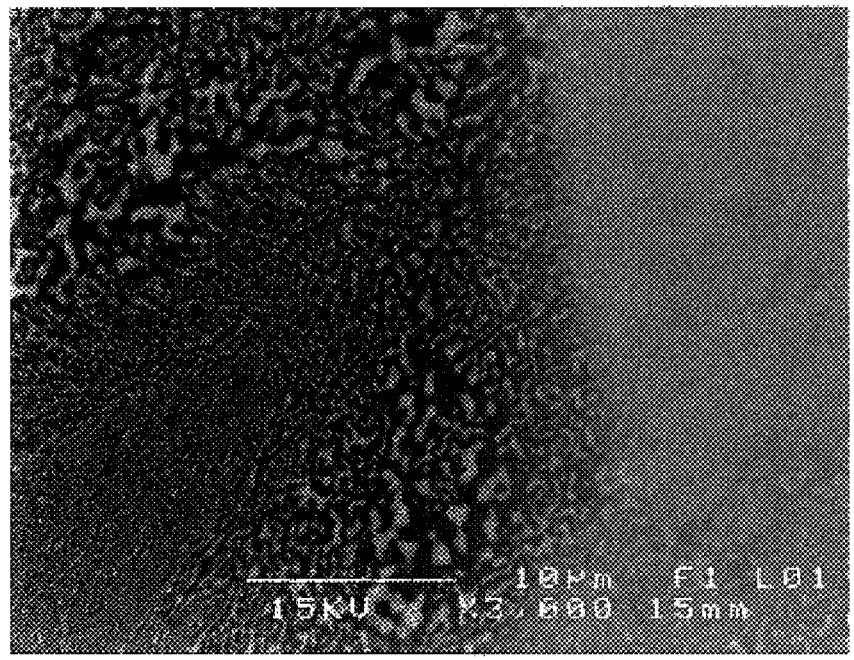
FIG. 10 is a scanning electron photomicrograph of a polished cross-section of Comparative Example F fused material.

FIG. 10 is a scanning electron microscope (SEM) photomicrograph of a polished section (prepared as described in Comparative Example A) of fused Comparative Illustrative Example F material. The photomicrograph shows a eutectic derived microstructure comprising a plurality of colonies. The colonies were about 5–40 micrometers in size. Based on powder x-ray diffraction of a portion of Comparative Example F material, and examination of the polished sample using SEM in the backscattered mode, it is believed that the white portions in the photomicrograph were crystalline $ZrO_2$, and the dark portions α-$Al_2O_3$. The widths of these phases observed in the polished section were up to about 0.5 micrometer.

The average microhardness of Comparative Example F was determined, as described above in Comparative Example A, to be 15.3 GPa.

Figure 15:
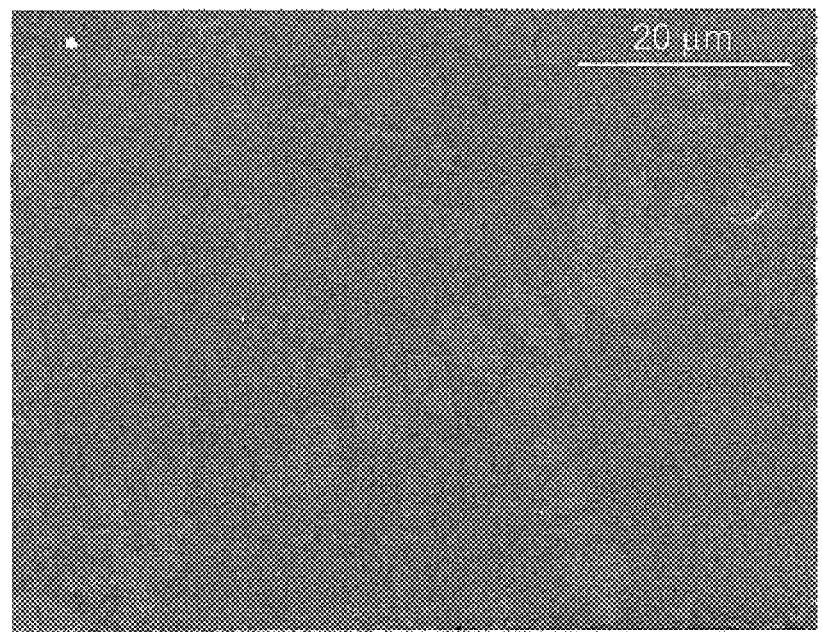
FIG. 15 is a scanning electron photomicrograph of a polished cross-section of Comparative Example F material.

Several Comparative Example F particles were heated placed in a platinum crucible and heated to 1000° C. at 50° C./hour, held at 1000° C. for 4 hours (in air), and then cooled to room temperature at about 100° C./hour. The color of the abrasive particles after heating was white. The average microhardness of the abrasive particles after heating Was 15.0 GPa. The polished cross-sections prepared for the microhardness measurements were examined using the SEM in the secondary electron mode. An SEM photomicrograph Comparative Example F material before heating is shown in FIG. 15. The microstructure observed after heating was substantially the same as the microstructure observed before heating.

Further powder x-ray diffraction, as described above for Comparative Example C, was used to qualitatively measure the phases present in Comparative Example F material before and after the above described heat-treatment by comparing the peak intensities of 111 of cubic and/or tetragonal reflection at about 2θ=30 degrees, to that of 11$\overline{1}$ of monoclinic reflection at about 2θ=28 degrees. The unheat-treated Comparative Example F material contained predominantly cubic and/or tetragonal zirconia before and after the heat-treatment (i.e., there was no significant difference noted in the x-ray diffraction results).

Figure 16:
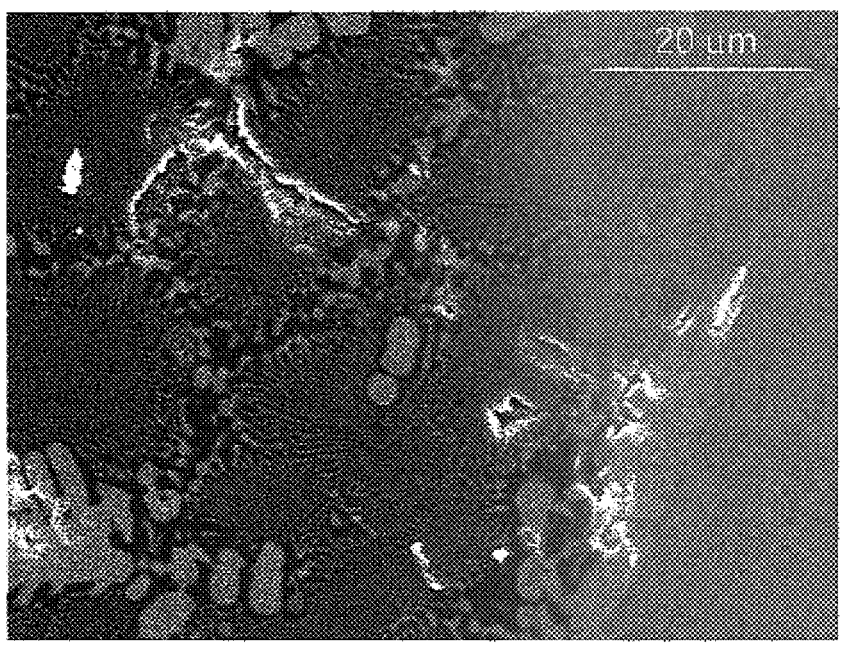
FIG. 16 is a scanning electron photomicrograph of a polished cross-section of Comparative Example F material after exposure to a specified heating condition.

Several Comparative Example F particles were also heated placed in a platinum crucible and heated to 1000 ° C. at 50° C./hour, held at 1000° C. for 8 hours (in air), and then cooled to room temperature at about 100° C./hour. The color of the abrasive particles after heating was white. The average microhardness of the abrasive particles after heating was 15.0 GPa. The polished cross-sections prepared for the microhardness measurements were examined using the SEM in the secondary electron mode. The microstructure observed after heating was only slightly different than that observed before heating. An SEM photomicrograph Illustrative Example F after heating is shown in FIG. 16. There was some cracks observed in the heat-treated material, generally near primary crystals of $ZrO_2$.

Differential Thermal Analysis (DTA) And Thermogravimetric Analysis (TGA) of Comparative Examples A, C, and F Abrasive Particles/Materials Differential thermal analysis (DTA) and thermogravimetric analysis (TGA) were conducted for each of Comparative Example A, C, and F abrasive particles/materials. Each material was crushed with a mortar and pestle and screened to retain particles that were in the 400–500 micrometer size range.

DTA/TGA runs were made (using an instrument obtained from Netzsch Instruments, Selb, Germany under the trade designation "NETZSCH STA 409 DTA/TGA") for each of the screened samples. The amount of each screened sample placed in the 100 microliter $Al_2O_3$ sample holder was 129.5 micrograms (Comparative Example A), 125.8 micrograms (Comparative Example F), 127.3 micrograms (Comparative Example C), respectively. Each sample was heated in static air at a rate of 10° C./minute from room temperature (about 25° C.) to 1300° C.

Figure 5:
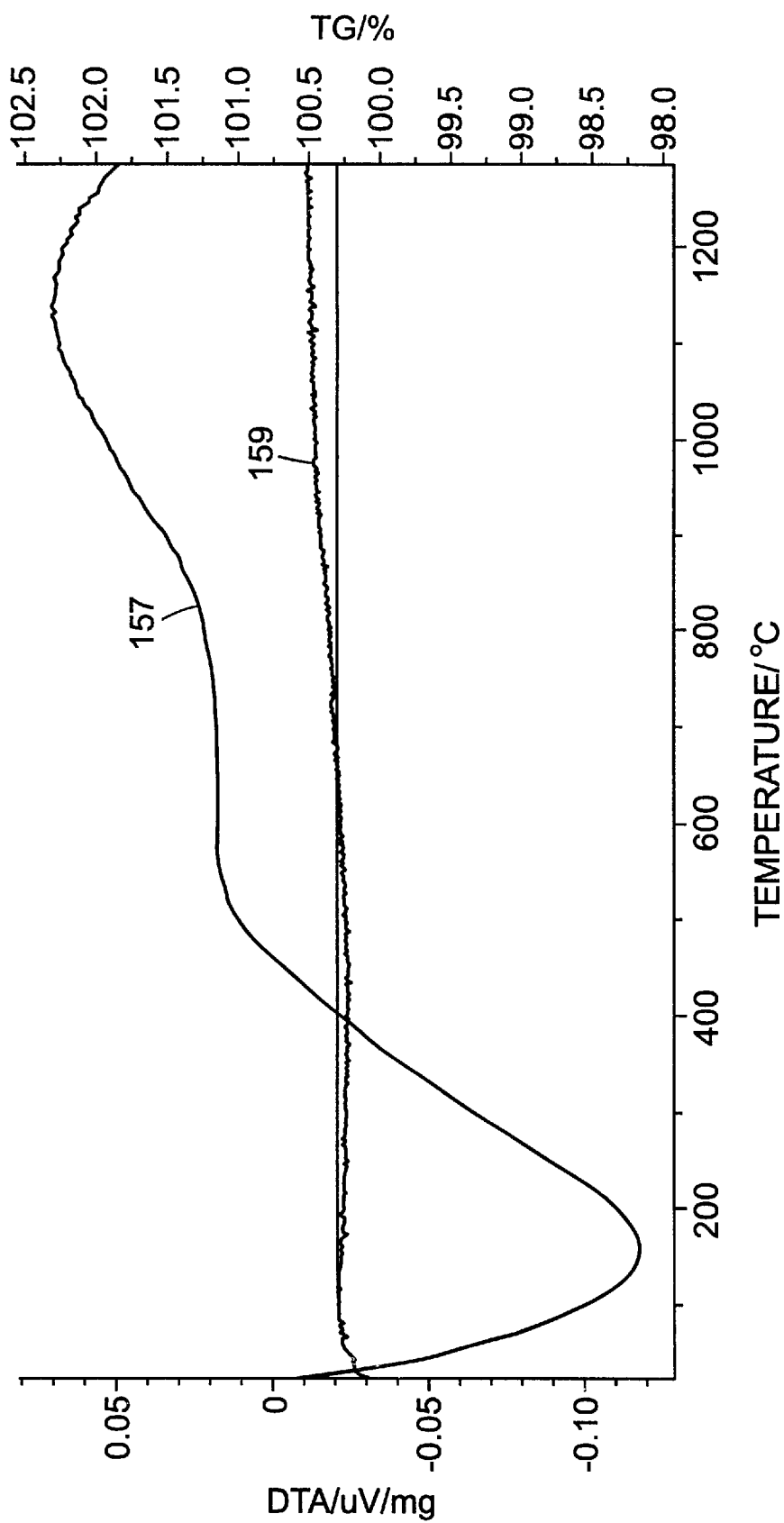
FIG. 5 is a Differential thermal analysis (DTA) plot and Thermogravimetric Analysis (TGA) plot of Comparative Example A fused material.
Figure 6:
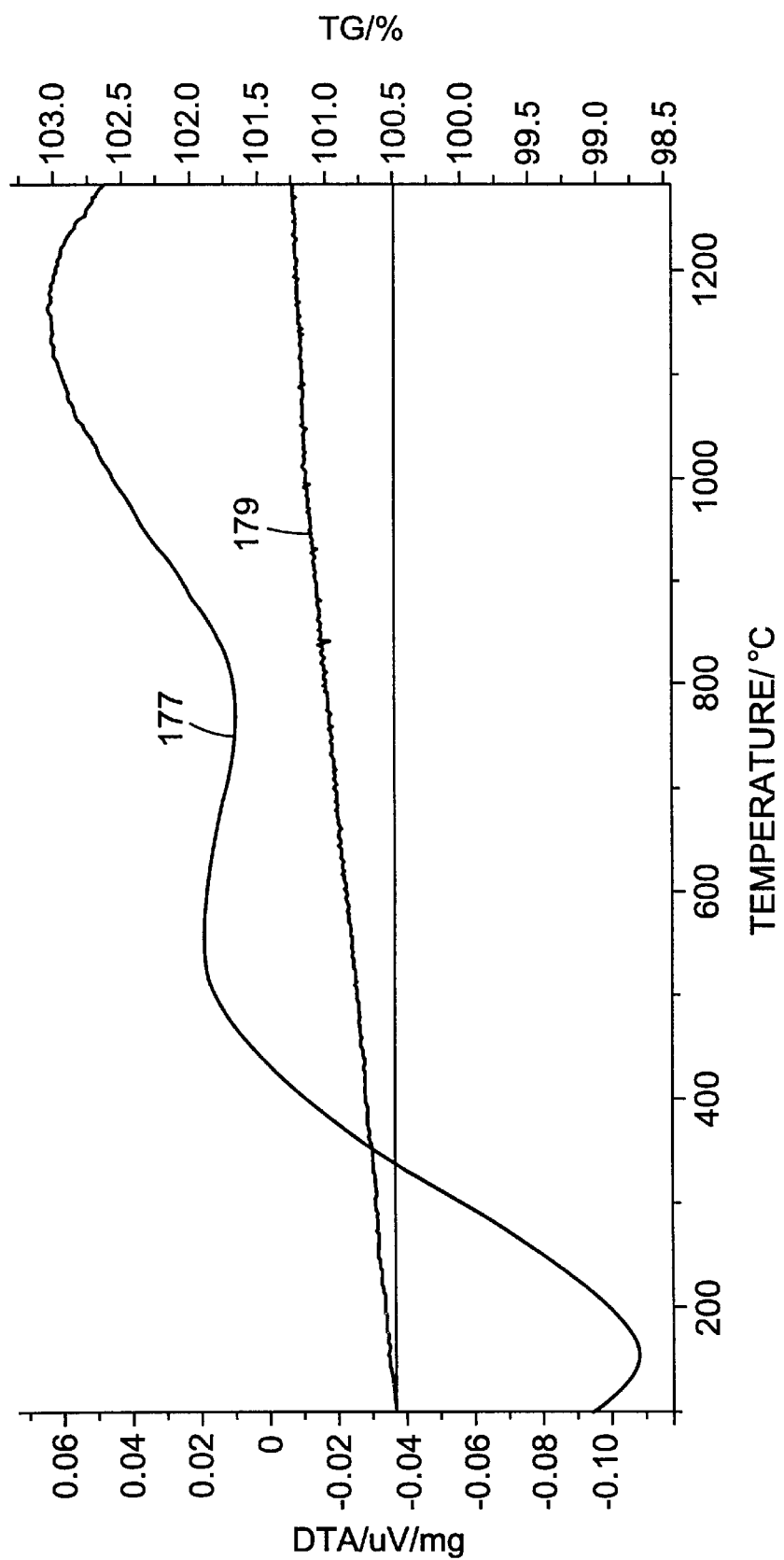
FIG. 6 is a DTA plot and TGA plot of Comparative Example F fused material.
Figure 7:
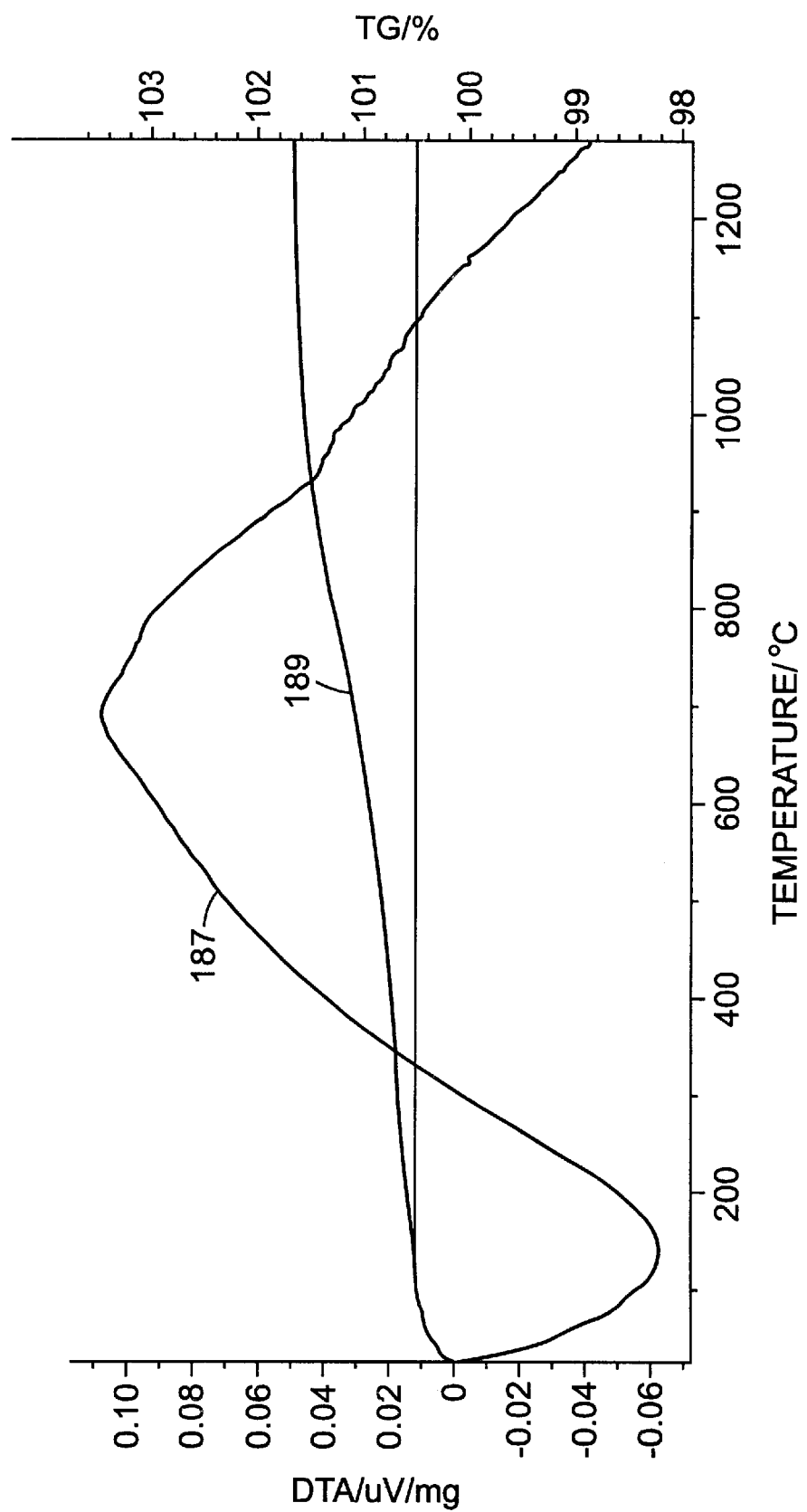
FIG. 7 is a DTA plot and TGA plot of Comparative Example C abrasive particles.

Referring to FIG. 5, line 157 is the plotted DTA data for the Comparative Example A material; line 159, the plotted TGA data. Referring to FIG. 6, line 177 is the plotted DTA data for the Comparative Example F material; line 179, the plotted TGA data. Referring to FIG. 7, line 187 is the plotted DTA data for the Comparative Example C material; line 189, the plotted TGA data. The change in weight of the sample through the TGA run was, for Comparative Example A, 0.22%; for Comparative Example F, 0.73%; and, for Comparative Example C, 1.16%.

Example 1

Example 1 fused material, abrasive particles, and coated abrasive discs were prepared as described in Comparative Example A, except the polyethylene bottle was charged with 171.6 grams of alumina powder ("APA-0.5"), 83.4 grams of yttrium oxide powder (obtained from H.C. Starck, Newton, Mass.), 45 grams of zirconium oxide powder (with a nominal composition of 100 wt % $ZrO_2$ (+$HfO_2$); obtained under the trade designation "DK-2" from Zirconia Sales, Inc. of Marietta, Ga.), 0.6 gram of a dispersing agent ("DURAMAX D-30005"), and 100 grams of distilled water. The fused material was white-red in color.

Figure 17:
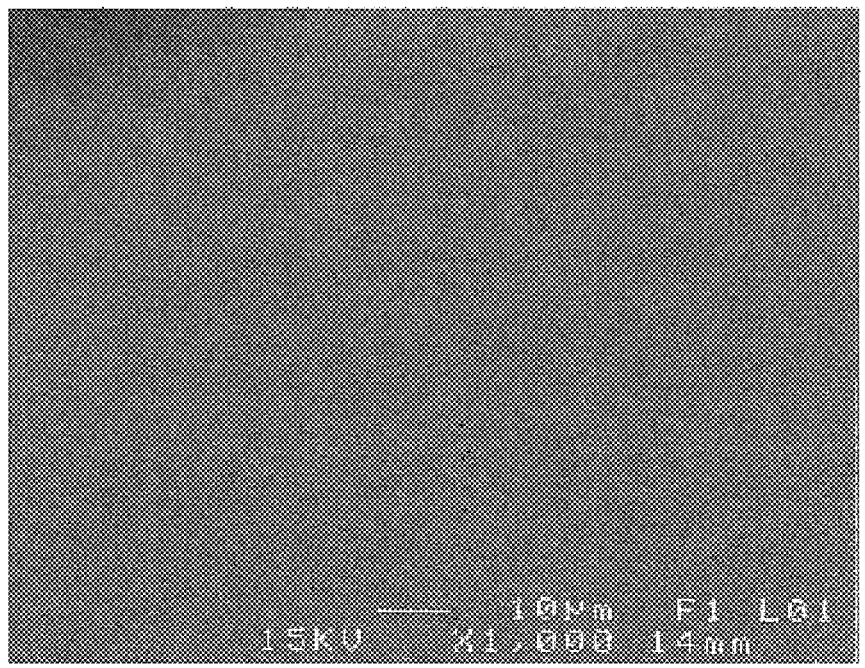
FIGS. 17 and 18 are scanning electron photomicrographs of polished cross-sections of Example 1.
Figure 18:
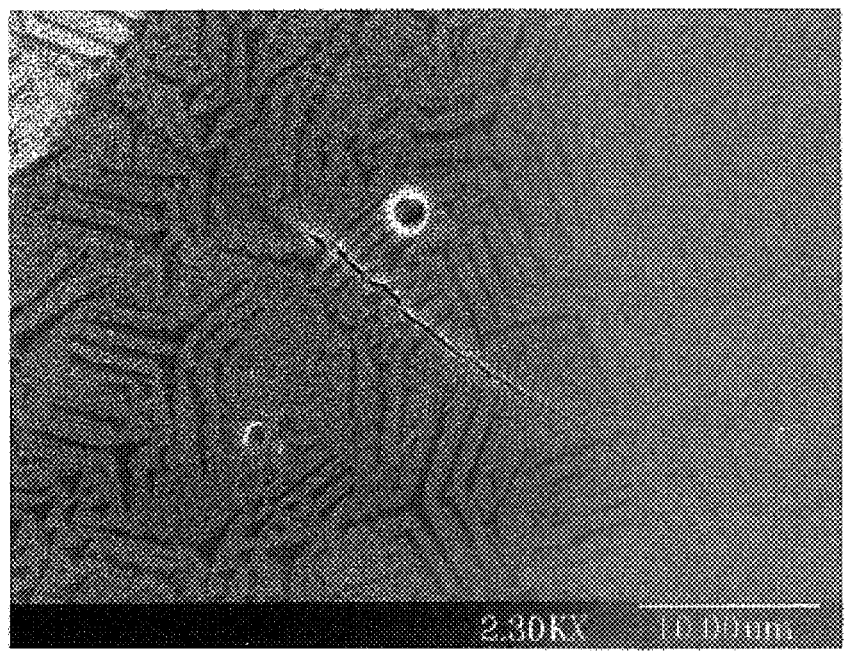

FIGS. 17 and 18 is a scanning electron microscope (SEM) photomicrograph of a polished section (prepared as described in Comparative Example A) of fused Example 1 material. Referring to FIGS. 17 and 18, the photomicrograph shows a eutectic-derived microstructure comprising a plurality of colonies. The colonies were about 5–30 micrometers in size. Based on powder x-ray diffraction of a portion of Example 1 material, and examination of the polished sample using SEM in the backscattered mode, it is believed that the white portions in the photomicrograph were crystalline cubic $ZrO_2$, the gray portions crystalline $Y_3Al_5O_{12}$, and the dark portions $\alpha$-$Al_2O_3$. The widths of these phases observed in the polished section were up to about 3 micrometers. Eutectic phases making up the colonies were in a lamellar arrangement. The alumina phases were seen as crystals exhibiting a trigonal shape. The orientation of at least a portion of the lamellar (i.e. orientation of eutectic crystallization) was observed to follow the orientation of the alumina in trigonal outline which was evident by an approximately 120 degree angle at which adjacent lamellar run into each other. While not wishing to be bounded by theory, it is believed that during crystallization of the melt of a composition at or near ternary eutectic, primary alumina crystallized first as a seed in a trigonal shape. The consequent coupled growth of eutectic in the form of lamellar followed, at least initially, the orientation of the seed. A eutectic colony then included alumina seeds of the same orientation (or a single seed) together with the eutectic lamellar growth. Further, it was observed that the colony boundaries did not exhibit phase coarsening as was observed in the binary eutectic (manifested by the significant coarsening of crystals of eutectic phases in an immediate vicinity of colony boundary) of Comparative Example A.

The average microhardness of Example 1 was determined, as described above in Comparative Example A, to be 16.5 GPa.

Several Example 1 particles were heated placed in a platinum crucible and heated to 1000° C. at 50° C./hour, held at 1000° C. for 8 hours (in air), and then cooled to room temperature at about 1000° C./hour. The color of the abrasive particles after heating was white. The average microhardness of the Example 1 particles after heating was 16.7 GPa.

Grinding Performance of Example 1 and Comparative Examples B–D

The grinding performance of Example 1 and Comparative Examples B–D coated abrasive discs were evaluated as were evaluated as described above for Comparative Examples A–D. The results are reported in Table 2, below.

TABLE 2

| Example | Total cut, g | Final cut, g |
| --- | --- | --- |
| Comp. B | 424 | 24 |
| Comp. C | 614 | 45 |
| Comp. D | 940 | 79 |
| 1 | 711 | 58 |

Example 2

Example 2 fused material was prepared as described in Comparative Example A, except the polyethylene bottle was charged with 181.7 grams of alumina powder ("APA-0.5"), 88.3 grams of yttrium oxide powder (obtained from H.C. Starck, Newton, Mass.), 30 grams of zirconium oxide powder ("DK-2"), 0.6 gram of a dispersing agent ("DURAMAX D-30005"), and 100 grams of distilled water.

Figure 19:
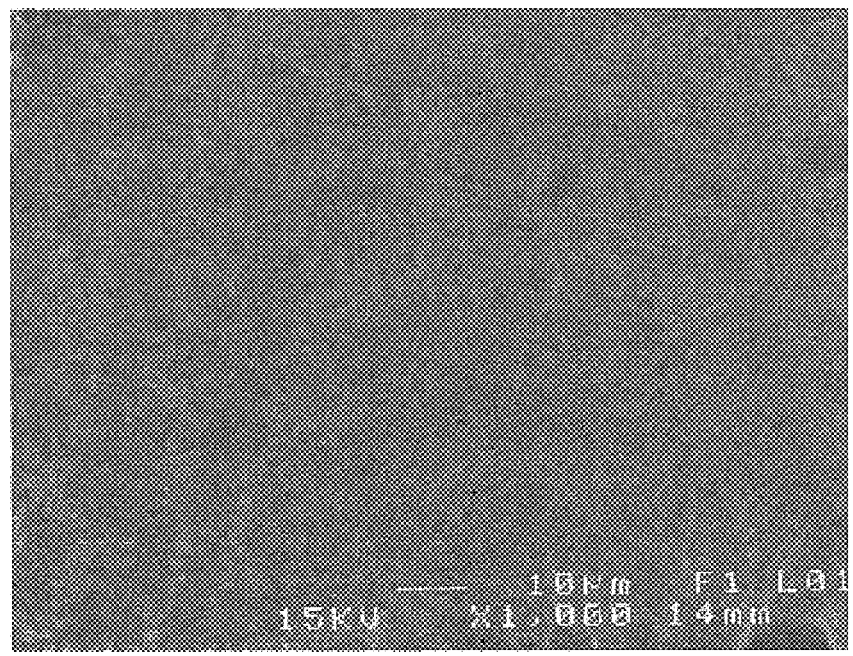
FIGS. 19 and 20 are scanning electron photomicrographs of polished cross-sections of Example 2 and 3 fused materials, respectively.

FIG. 19 is a scanning electron microscope (SEM) photomicrograph of a polished section (prepared as described in Comparative Example A) of fused Example 2 material. Referring to FIG. 19, the photomicrograph shows a ternary eutectic-derived microstructure comprising a plurality of colonies. The colonies were about 10–40 micrometers in size. Based on powder x-ray diffraction of a portion of Example 2 material, and examination of the polished sample using SEM in the backscattered mode, it is believed that the white portions in the photomicrograph were crystalline cubic $ZrO_2$, the gray portions crystalline $Y_3Al_5O_{12}$, and the dark portions $\alpha$-$Al_2O_3$. The widths of these phases observed in the polished section were up to about 5 micrometer. Further, large primary crystals (believed to be $Al_2O_3$ and $Y_3Al_5O_{12}$), present in the form of dendrites, were observed in some areas of the polished cross-section, indicating possible deviation of the composition from an exact eutectic composition.

Example 3

Example 3 fused material was prepared as described in Comparative Example A, except the polyethylene bottle was charged with 141.3 grams of alumina powder ("APA-0.5"), 68.7 grams of yttrium oxide powder (obtained from H.C. Starck, Newton, Mass.), 90 grams of zirconium oxide powder ("DK-2"), 0.6 gram of a dispersing agent ("DURAMAX D-30005"), and 100 grams of distilled water.

Figure 20:
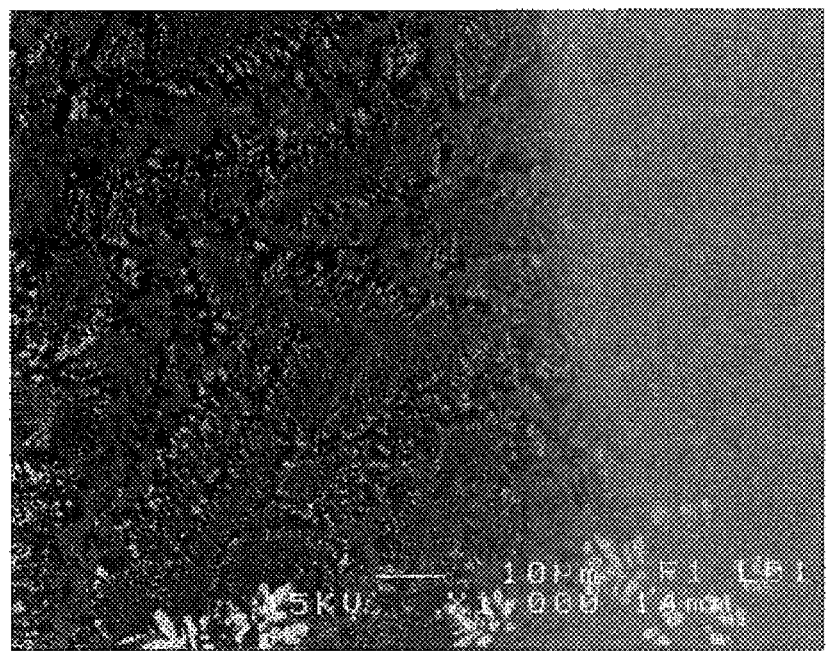

FIG. 20 is a scanning electron microscope (SEM) photomicrograph of a polished section (prepared as described in Comparative Example A) of fused Example 3 material. Referring to FIG. 20, the photomicrograph shows a ternary eutectic-derived microstructure comprising a plurality of colonies. The colonies were about 10–40 micrometers in size. Based on powder x-ray diffraction of a portion of Example 3 material, and examination of the polished sample using SEM in the backscattered mode, it is believed that the white portions in the photomicrograph were crystalline cubic $ZrO_2$, the gray portions crystalline $Y_3Al_5O_{12}$, and the dark portions $\alpha$-$Al_2O_3$. The widths of these phases observed in the polished section were up to about 5 micrometers. Further, large primary crystals (believed to be $ZrO_2$), present in the form of dendrites, were observed in some areas of the polished cross-section, indicating possible deviation of the composition from an exact eutectic composition.

Comparative Example G

Comparative Example G fused material was prepared as described in Comparative Example A, except the polyethylene bottle was charged with 191.8 grams of alumina powder ("APA-0.5"), 93.2 grams of yttrium oxide powder (obtained from H.C. Starck, Newton, Mass.), 15 grams of zirconium oxide powder ("DK-2"), 0.6 gram of a dispersing agent ("DURAMAX D-30005"), and 100 grams of distilled water.

Figure 21:
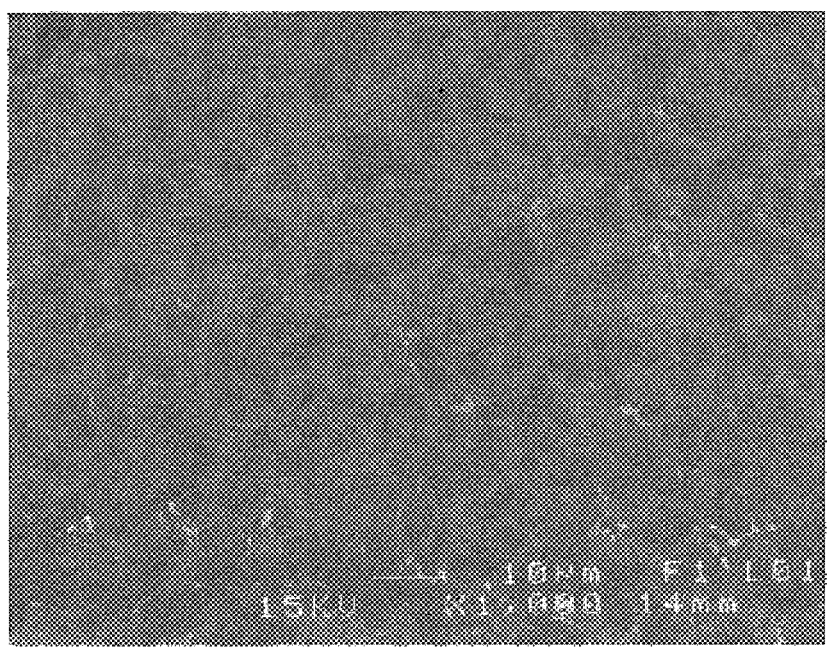
FIGS. 21, 22, and 23 are scanning electron photomicrographs of polished cross-sections of Comparative Example G, H, and I fused material, respectively.

FIG. 21 is a scanning electron microscope (SEM) photomicrograph of a polished section (prepared as described in Comparative Example A) of fused Comparative Example G material. Referring to FIG. 21, the photomicrograph shows a binary eutectic-derived microstructure comprising a plurality of colonies. Based on powder x-ray diffraction of a portion of Comparative Example G material, and examination of the polished sample using SEM in the backscattered mode, it is believed that the white portions in the photomicrograph were crystalline cubic $ZrO_2$, the gray portions crystalline $Y_3Al_5O_{12}$, and the dark portions $\alpha$-$Al_2O_3$. The widths of these phases observed in the polished section were up to about 10 micrometers. Further, large primary crystals (believed to be $ZrO_2$) where observed between crystals of $Al_2O_3$ and $Y_3Al_5O_{12}$, indicating that deviation of the composition from an exact eutectic composition is quite large.

Comparative Example H

Comparative Example H fused material was prepared as described in Comparative Example A, except the polyethylene bottle was charged with 201.9 grams of alumina powder ("APA-0.5"), 88.3 grams of yttrium oxide powder (obtained from H.C. Starck, Newton, Mass.), 9.8 grams of neodymium oxide powder (obtained from Molycorp, Inc., Brea, Calif.), 0.6 gram of a dispersing agent ("DURAMAX D-30005"), and 100 grams of distilled water.

Figure 22:
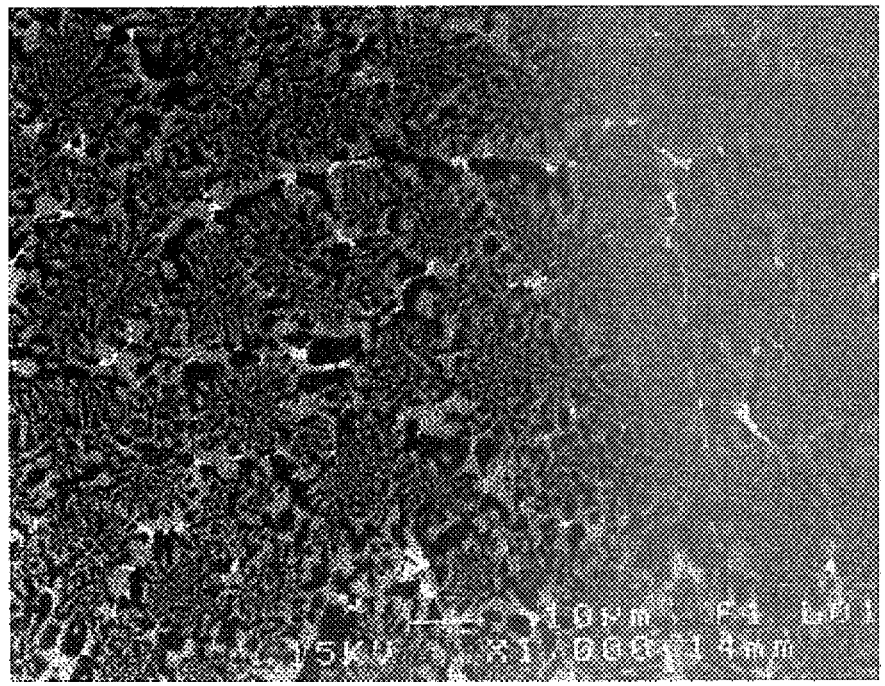

FIG. 22 is a scanning electron microscope (SEM) photomicrograph of a polished section (prepared as described in Comparative Example A) of fused Comparative Example H material. Referring to FIG. 22, the photomicrograph shows a eutectic-derived microstructure. Based on powder x-ray diffraction of a portion of Comparative Example H material, and examination of the polished sample using SEM in the backscattered mode, it is believed that the white portions in the photomicrograph were Nd-rich phase, the gray portions crystalline yttrium aluminum garnet with some yttrium substituted by neodymium, and the dark portions $\alpha$-$Al_2O_3$. The widths of these phases observed in the polished section were up to about 10 micrometers.

Comparative Example I

Comparative Example I fused material, abrasive particles and coated abrasive discs were prepared as described in Comparative Example A, except (a) the polyethylene bottle was charged with 201.9 grams of alumina powder ("APA-0.5") and 98.1 grams of yttrium oxide powder (obtained from H.C. Starck, Newton, Mass.), and (b) the powders were present in amounts to provide 82 mole % $Al_2O_3$ and 18 mole % $Y_2O_3$.

Figure 23:
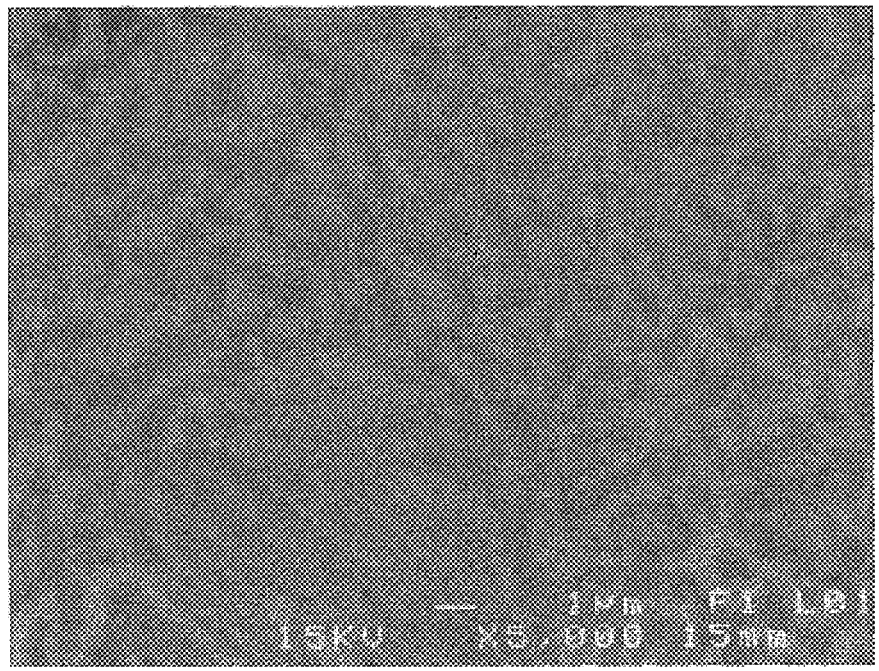

FIG. 23 is a scanning electron microscope (SEM) photomicrograph of a polished section (prepared as described in Comparative Example A) of fused Comparative Example I material. Referring again to FIG. 23, the photomicrograph shows a eutectic-derived microstructure comprising a plurality of colonies. The icolonies were about 10–40 micrometers in size. Based on powder x-ray diffraction of a portion of Comparative Example I material, and examination of the polished sample using SEM in the backscattered mode, it is believed that the white portions in the photomicrograph were crystalline $Y_3Al_5O_{12}$, and the dark portions $\alpha c$-$Al_2O_3$. The widths of these phases observed in the polished section were up to about 1 micrometer.

Grinding Performance of Comparative Examples A–C and I

The grinding performance of Comparative Examples A–C and I coated abrasive discs were evaluated as described above for Comparative Examples A–D. The results are reported in Table 3, below.

TABLE 3

| Example | Total cut, g | Final cut, g |
| --- | --- | --- |
| Comp. B | 431 | 25 |
| Comp. C | 674 | 50 |
| Comp. D | 933 | 78 |
| Comp. I | 787 | 56 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A plurality of abrasive particles having a specified nominal grade, said plurality of abrasive particle having a particle size distribution ranging from fine to coarse, wherein at least a portion of said abrasive particles is a plurality of fused, crystalline abrasive particles, said fused abrasive particles comprising at least 20 percent by volume, based on the total metal oxide volume of the respective particle, eutectic material, wherein said eutectic material comprises eutectic of at least:
    (a) crystalline $ZrO_2$ and
    (b) at least two of:
        (i) crystalline $Al_2O_3$,
        (ii) first crystalline complex $Al_2O_3 \cdot Y_2O_3$, or
        (iii) second, different, crystalline complex $Al_2O_3 \cdot Y_2O_3$.

2. The plurality of abrasive particles according to claim 1 said fused, crystalline abrasive particles comprise at least 50 percent by volume, based on the total metal oxide volume of the respective particle, of said eutectic material.

3. The plurality of abrasive particles according to claim 2 comprising, on a theoretical oxide basis, at least 40 percent by weight $Al_2O_3$, based on the total metal oxide content of the respective particle.

4. The plurality of abrasive particles according to claim 3, wherein said fused, crystalline abrasive particles further comprise primary crystals or $Al_2O_3$.

5. The plurality of abrasive particles according to claim 3, wherein said fused, crystalline abrasive particles comprise colonies of said eutectic, and wherein said colonies have an average size of less than 100 micrometers.

6. The plurality of abrasive particles according to claim 5, wherein said colonies have an average size of less than 50 micrometers.

7. The plurality of abrasive particles according to claim 3, wherein said fused, crystalline abrasive particles comprise colonies of said eutectic, and wherein crystals making up said colonies are, on average, up to 10 micrometers in size.

8. The plurality of abrasive particles according to claim 7, wherein said crystals are, on average, up to 1 micrometer in size.

9. The plurality of abrasive particles according to claim 3, wherein said fused, crystalline abrasive particles further comprises at least one of crystalline rare earth oxide or crystalline complex $Al_2O_3 \cdot$ rare earth oxide.

10. The plurality of abrasive particles according to claim 3, wherein said fused, crystalline abrasive particles further comprise at least one of crystalline BaO, CaO, $Cr_2O_3$, CoO, $Fe_2O_3$, $HfO_2$, $Li_2O$, MgO, MnO, NiO, $SiO_2$, $TiO_2$, $Na_2O$, $Sc_2O_3$, SrO, $V_2O_3$, ZnO, or complex $Al_2O_3 \cdot$ metal oxide thereof.

11. The plurality of abrasive particles according to claim 3, wherein said fused, crystalline abrasive particles have an average microhardness of at least 13 GPa.

12. The plurality of abrasive particles according to claim 3, wherein ar least one of said first crystalline complex $Al_2O_3.Y_2O_3$ or said second, different, crystalline complex $Al_2O_3.Y_2O_3$ further comprises cations selected from the group consisting of Cr, Ti, Sc, Fe, Mg, Ca, Si, Co, Ce, Dy, Er, Eu, Gd, Ho, La, Lu, Nd, Pr, Sm, Th, Tm, Yb, and combinations thereof.

13. A plurality of abrasive particles having a specified nominal grade, said plurality of abrasive particle having a particle size distribution ranging from fine to coarse, wherein at least a portion of said abrasive particles is a plurality of fused, crystalline abrasive particles, wherein said eutectic material comprises eutectic of at least:
(a) crystalline $ZrO_2$ and
(b) at least two of:
(i) crystalline $Al_2O_3$,
(ii) first crystalline complex $Al_2O_3.Y_2O_3$, or
(iii) second, different, crystalline complex $Al_2O_3.Y_2O_3$, wherein said fused, crystalline abrasive particles comprise at least 50 percent by volume, based on the total metal oxide volume of the respective particle, of said eutectic material, wherein the abrasive particles comprising, on a theoretical oxide basis, at least 40 percent by weight $Al_2O_3$, based on the total metal oxide content of the respective particle, and wherein a portion of at least one of said first crystalline complex $Al_2O_3.Y_2O_3$ or said second, different, crystalline complex $Al_2O_3.Y_2O_3$ Al cations are substituted with at least one cation selected from the following cations: Cr, Ti, Sc, Fe, Mg, Ca, Si, and Co.

14. A plurality of abrasive particles having a specified nominal grade, said plurality of abrasive particle having a particle size distribution ranging from fine to coarse, wherein at least a portion of said abrasive particles is a plurality of fused, crystalline abrasive particles, wherein said eutectic material comprises eutectic of at least:
(a) crystalline $ZrO_2$ and
(b) at least two of:
(i) crystalline $Al_2O_3$,
(ii) first crystalline complex $Al_2O_3.Y_2O_3$, or
(iii) second, different, crystalline complex $Al_2O_3.Y_2O_3$, wherein said fused, crystalline abrasive particles comprise at least 50 percent by volume, based on the total metal oxide volume of the respective particle, of said eutectic material, wherein the abrasive particles comprising, on a theoretical oxide basis, at least 40 percent by weight $Al_2O_3$, based on the total metal oxide content of the respective particle, and wherein a portion of at least one of said first crystalline complex $Al_2O_3.Y_2O_3$ or said second, different, crystalline complex $Al_2O_3.Y_2O_3$ Y cations are substituted with at least one cation selected from the following cations: Ce, Dy, Er, Eu, Gd, Ho, La, Lu, Nd, Pr, Sm, Th, Tm, and Yb.

15. A plurality of abrasive particles having a specified nominal grade, said plurality of abrasive particle having a particle size distribution ranging from fine to coarse, wherein at least a portion of said abrasive particles is a plurality of fused, crystalline abrasive particles, wherein said eutectic material comprises eutectic of at least:
(a) crystalline $ZrO_2$ and
(b) at least two of:
(i) crystalline $Al_2O_3$,
(ii) first crystalline complex $Al_2O_3.Y_2O_3$, or
(iii) second, different, crystalline complex $Al_2O_3.Y_2O_3$, wherein said fused crystalline abrasive particles comprise at least 50 percent by volume, based on the total metal oxide volume of the respective particle, of said eutectic material, wherein the abrasive particles comprising, on a theoretical oxide basis, at least 40 percent by weight $Al_2O_3$, based on the total metal oxide content of the respective particle, and wherein a portion of at least one of said first crystalline complex $Al_2O_3.Y_2O_3$ or said second, different, crystalline complex $Al_2O_3.Y_2O_3$ Y cations are substituted with at least one cation selected from the following cations: Fe, Ti, Mn, V, Cr, Co, Ni, Cu, Mg, Ca, and Sr.

16. The plurality of abrasive particles according to claim 2, said fused, crystalline abrasive particles further comprise primary crystals of $Y_3Al_5O_{12}$.

17. The plurality of abrasive particles according to claim 1, wherein said eutectic is eutectic of at least (a) crystalline $ZrO_2$, (b) crystalline $Al_2O_3$, and (c) crystalline complex $Al_2O_3.Y_2O_3$.

18. The plurality of abrasive particles according to claim 17 comprising at least 50 percent by volume, based on the total metal oxide volume of the respective particle, of said eutectic material.

19. The plurality of abrasive particles according to claim 18 comprising, on a theoretical oxide basis, at least 40 percent by weight $Al_2O_3$, based on the total metal oxide content the respective particle.

20. The plurality of abrasive particles according to claim 19, wherein said fused, crystalline abrasive particles comprise colonies of said eutectic, and wherein crystals making up said colonies are, on average, up to 10 micrometers in size.

21. The plurality of abrasive particles according to claim 19, wherein said fused, crystalline abrasive particles further comprise at least one of crystalline BaO, CaO, $Cr_2O_3$, CoO, $Fe_2O_3$, $HfO_2$, $Li_2O$, MgO, MnO, NiO, $SiO_2$, $TiO_2$, $Na_2O$, SrO, $Sc_2O_3$, $V_2O_3$, ZnO or complex $Al_2O_3$.metal oxide thereof.

22. The plurality of abrasive particles according to claim 19, wherein said fused, crystalline abrasive particles have an average microhardness of at least 13 GPa.

23. The plurality of abrasive particles according to claim 2, wherein said eutectic is eutectic of at least (a) crystalline $ZrO_2$, (b) first crystalline complex $Al_2O_3.Y_2O_3$, and (c) second, different, crystalline complex $Al_2O_3.Y_2O_3$.

24. The plurality of abrasive particles according to claim 23 comprising at least 50 percent by volume, based on the total metal oxide volume of said particle, of said eutectic material.

25. The plurality of abrasive particles according to claim 24 comprising, on a theoretical oxide basis, at least 40 percent by weight $Al_2O_3$, based on the total metal oxide content said particle.

26. The plurality of abrasive particles according to claim 25, wherein said fused, crystalline abrasive particles comprise colonies of said eutectic, and wherein crystals making up said colonies are, on average, up to 10 micrometers in size.

27. The plurality of abrasive particles according to claim 25, wherein said fused, crystalline particles further comprise at least one of crystalline BaO, CaO, $Cr_2O_3$, CoO, $Fe_2O_3$, $HfO_2$, $Li_2O$, MgO, MnO, NiO, $SiO_2$, $TiO_2$, $Na_2O$, SrO, $Sc_2O_3$, $V_2O_3$, ZnO, or complex $Al_2O_3$.metal oxide thereof.

28. The plurality of abrasive particles according to claim 25, wherein said fused, crystalline abrasive particles have an average microhardness of at least 13 GPa.

29. A plurality of abrasive particles having a specified nominal grade, said plurality of abrasive particle having a particle size distribution ranging from fine to coarse, wherein at least a portion of said abrasive particles is a plurality of fused, crystalline abrasive particles, said fused abrasive particles comprising at least 20 percent by volume, based on the total metal oxide volume of the respective particle, eutectic material, wherein said eutectic material comprises eutectic of at least:

(a) crystalline complex $Al_2O_3.Y_2O_3$ and (b) crystalline $ZrO_2$.

30. The plurality of abrasive particles according to claim 29 comprising at least 50 percent by volume, based on the total metal oxide volume of the respective particle, of said eutectic material.

31. The plurality of abrasive particles according to claim 30 comprising, on a theoretical oxide basis, at least 40 percent by weight $Al_2O_3$, based on the total metal oxide content the respective particle.

32. The plurality of abrasive particles according to claim 30, wherein said fused, crystalline abrasive particles comprise colonies of said eutectic, and wherein crystals making up said colonies are, on average, up to 10 micrometers in size.

33. The plurality of abrasive particles according to claim 30, wherein said fused, crystalline abrasive particles further comprise comprises at least one of crystalline BaO, CaO, $Cr_2O_3$, CoO, $Fe_2O_3$, $HfO_2$, $Li_2O$, MgO, MnO, NiO, $SiO_2$, $TiO_2$, $Na_2O$, SrO, $Sc_2O_3$, $V_2O_3$, ZnO, or complex $Al_2O_3$metal oxide thereof.

34. The plurality of abrasive particles according to claim 30, wherein said fused, crystalline abrasive particles have an average microhardness of at least 13 GPa.

35. The plurality of abrasive particles according to claim 30 wherein at least a majority by weight of said crystalline $ZrO_2$ is cubic $ZrO_2$.

36. The plurality of abrasive particles according to claim 29 wherein at least a majority by weight of said crystalline $ZrO_2$ is cubic $ZrO_2$.

37. A method for making fused, crystalline abrasive particles comprising at least 20 percent by volume, based on the total volume of the respective particle, eutectic material, wherein said eutectic material comprises eutectic of at least (a) crystalline $ZrO_2$ and (b) at least two of (i) crystalline $Al_2O_3$, (ii) first crystalline complex $Al_2O_3.Y_2O_3$, or (iii) second, different, crystalline complex $Al_2O_3.Y_2O_3$, said method comprising:

melting at least one $Al_2O_3$ source, at least one $Y_2O_3$ source, and at least one $ZrO_2$ source to provide a melt;

converting the melt to said fused, crystalline abrasive particles; and grading said fused, crystalline abrasive particles to provide a plurality of abrasive particles having a specified nominal grade, said plurality of abrasive particles having a particle size distribution ranging from fine to coarse, wherein at least a portion of said plurality of abrasive particles is a plurality of said fused, crystalline abrasive particles.

38. The method according to claim 37, wherein converting includes:

cooling the melt to provide a solidified material; and crushing the solidified material to provide said fused, crystalline abrasive particles.

39. The method according to claim 38, wherein cooling the melt includes cooling the melt with metallic plates.

40. The method according to claim 38, wherein cooling the melt includes cooling the melt with metallic balls.

41. The method according to claim 37, wherein said eutectic is eutectic of at least (a) crystalline $ZrO_2$ (b) crystalline $Al_2O_3$, and crystalline complex $Al_2O_3.Y_2O_3$.

42. The method according to claim 37, wherein said eutectic is eutectic of at least (a) crystalline $ZrO_2$, (b) first crystalline complex $Al_2O_3.Y_2O_3$, and (c) second, different, crystalline complex $Al_2O_3.Y_2O_3$.

43. A method for making fused, crystalline abrasive particles comprising at least 20 percent by volume, based on the total volume of the respective particle, eutectic material, wherein said eutectic material comprises eutectic of at least (a) crystalline complex $Al_2O_3.Y_2O_3$ and (b) crystalline $ZrO_2$, said method comprising:

melting at least one $Al_2O_3$ source, at least one $Y_2O_3$ source, and at least one $ZrO_2$ source to provide a melt;

converting the melt to said fused, crystalline abrasive particles; and grading said fused, crystalline abrasive particles to provide a plurality of abrasive particles having a specified nominal grade, said plurality of abrasive particles having a particle size distribution ranging from fine to course, wherein at least a portion of said plurality of abrasive particles is a plurality of said fused, crystalline abrasive particles.

44. An abrasive article comprising a binder and a plurality of abrasive particles, wherein at least a portion of said abrasive particles are fused, crystalline abrasive particles comprising at least 20 percent by volume, based on the total volume of the respective particle, eutectic material, wherein said eutectic material comprises eutectic of at least:

(a) crystalline $ZrO_2$ and (b) at least two of:

(i) crystalline $Al_2O_3$, (ii) first crystalline complex $Al_2O_3.Y_2O_3$, or (iii) second, different, crystalline complex $Al_2O_3.Y_2O_3$.

45. The abrasive article according to claim 44, wherein said article is a coated abrasive article, and further comprises a backing.

46. The abrasive article according to claim 44, wherein said article is a bonded abrasive article.

47. The abrasive article according to claim 44, wherein said article is a nonwoven abrasive article, and further comprises a nonwoven web.

48. The abrasive article according to claim 44, wherein said eutectic is eutectic of at least (a) crystalline $ZrO_2$, (b) crystalline $Al_2O_3$, and (c) crystalline complex $Al_2O_3.Y_2O_3$.

49. The abrasive article according to claim 44, wherein said eutectic is eutectic of at least (a) crystalline $ZrO_2$, (b) first crystalline complex $Al_2O_3.Y_2O_3$, and (c) second, different, crystalline complex $Al_2O_3.Y_2O_3$.

50. An abrasive article comprising a binder and a plurality of abrasive particles, wherein at least a portion of said abrasive particles are fused, crystalline abrasive particles comprising at least 20 percent by volume, based on the total volume of the respective particle, eutectic material, wherein said eutectic material comprises eutectic of at least:

(a) crystalline complex $Al_2O_3.Y_2O_3$ and (b) crystalline $ZrO_2$.

51. The abrasive article according to claim 50 wherein at least a majority by weight of said crystalline $ZrO_2$ is cubic $ZrO_2$.

52. A vitrified bonded abrasive article comprising a plurality of abrasive particles bonded together via vitrified bonding material, wherein at least a portion of said plurality of abrasive particles are fused, crystalline abrasive particles comprising at least 20 percent by volume, based on the total volume of the respective particle, eutectic material, wherein said eutectic material comprises eutectic of at least:

(a) crystalline $ZrO_2$ and (b) at least two of:

(i) crystalline $Al_2O_3$, (ii) first crystalline complex $Al_2O_3 \cdot Y_2O_3$, or (iii) second, different, crystalline complex $Al_2O_3 \cdot Y_2O_3$.

53. The vitrified bonded abrasive article according to claim 52, wherein said vitrified bonding material comprises silica, alumina, and boria.

54. The vitrified bonded abrasive article according to claim 53, wherein said vitrified bonding material comprises at least 10 percent by weight of said alumina.

55. The vitrified bonded abrasive article according to claim 54, wherein said vitrified bonding material comprises at least 10 percent by weight of said boria.

56. The vitrified bonded abrasive article according to claim 52, wherein said eutectic is eutectic of at least (a) crystalline $ZrO_2$, (b) crystalline $Al_2O_3$, and (c) crystalline complex $Al_2O_3 \cdot Y_2O_3$.

57. The vitrified bonded abrasive article according to claim 52, wherein said eutectic is eutectic of at least (a) crystalline $ZrO_2$, (b) first crystalline complex $Al_2O_3 \cdot Y_2O_3$, and (c) second, different, crystalline complex $Al_2O_3 \cdot Y_2O_3$.

58. A vitrified bonded abrasive article comprising a plurality of abrasive particles bonded together via vitrified bonding material, wherein at least a portion of said plurality of abrasive particles are fused, crystalline abrasive particles comprising at least 20 percent by volume, based on the total volume of the respective particle, eutectic material, wherein said eutectic material comprises eutectic of at least:

(a) crystalline complex $Al_2O_3 \cdot Y_2O_3$ and (b) crystalline $ZrO_2$.

59. The vitrified bonded abrasive article according to claim 58 wherein at least a majority by weight of said crystalline $ZrO_2$ is cubic $ZrO_2$.

60. A method of abrading a surface, said method comprising:

providing an abrasive article comprising a binder and a plurality of abrasive particles, wherein at least a portion of said abrasive particles are fused, crystalline abrasive particle comprising at least 20 percent by volume, based on the total volume of the reselective particle, eutectic material, wherein said eutectic material comprises eutectic of at least (a) crystalline $ZrO_2$ and (b) at least two of (i) crystalline $Al_2O_3$, (ii) first crystalline complex $Al_2O_3 \cdot Y_2O_3$, or (iii) second, different, crystalline complex $Al_2O_3 \cdot Y_2O_3$;

contacting at least one of said fused, crystalline abrasive particles with a surface of a workpiece; and moving at least one of the contacted fired abrasive particle or said surface relative to the other to abrade at least a portion of said surface with the contacted fused abrasive particle.

61. The method according to claim 60, herein said eutectic is eutectic of at least (a) crystalline $ZrO_2$, (b) crystalline $Al_2O_3$, and (c) crystalline complex $Al_2O_3 \cdot Y_2O_3$.

62. The method according to claim 60, wherein said eutectic is eutectic of at least (a) crystalline $ZrO_2$, (b) first crystalline complex $Al_2O_3 \cdot Y_2O_3$, and (c) second, different, crystalline complex $Al_2O_3 \cdot Y_2O_3$.

63. A method of abrading a surface, said method comprising:

providing an abrasive article comprising a binder and a plurality of abrasive particles, wherein at least a portion of said abrasive particles are fused, crystalline abrasive particle comprising at least 20 percent by volume, based on the total volume of the respective particle, eutectic material, wherein said eutectic material comprises cutectic of at least (a) crystalline complex $Al_2O_3 \cdot Y_2O_3$ and (b) crystalline $ZrO_2$;

contacting at least one of said fused, crystalline abrasive particles with a surface of a workpiece; and moving at least one of the contacted fused abrasive particle or said surface relative to the other to abrade at least a portion of said surface with the contacted fused abrasive particle.

64. The method according to claim 63, wherein said eutectic is eutectic of at least (a) crystalline $ZrO_2$, (b) crystalline $Al_2O_3$, and (c) crystalline complex $Al_2O_3 \cdot Y_2O_3$.

65. The method according to claim 63, wherein said eutectic is eutectic of at least (a) crystalline $ZrO_2$, (b) first crystalline complex $Al_2O_3 \cdot Y_2O_3$, and (c) second, different, crystalline complex $Al_2O_3 \cdot Y_2O_3$.

66. The plurality of abrasive particles according to claim 1 wherein said specified nominal grade is selected from the group consisting of ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

67. The plurality of abrasive particles according to claim 1 wherein said specified nominal grade is selected from the group consisting of P16, P24, P36, P40, P50, P60, P80, P100, P120, P150, P180, P220, P320, P400, P500, P600, P800, P1000, P1200.

68. The plurality of abrasive particles according to claim 1 wherein said specified nominal grade is selected from the group consisting of JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JS8000, and JIS10,000.

69. The plurality of abrasive particles according to claim 29 wherein said specified nominal grade is selected from the group consisting of ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

70. The plurality of abrasive particles according to claim 29 wherein said specified nominal grade is selected from the group consisting of P16, P24, P36, P40, P50, P60, P80, P100, P120, P150, P180, P220, P320, P400, P500, P600, P800, P1000, and P1200.

71. The plurality of abrasive particles according to claim 29 wherein said specified nominal grade is selected from the group consisting of JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS100, JIS1500, JIS2500, JIS4000, JIS6000, JIS8000, and JIS10,000.

72. The method according to claim 60 wherein said surface is selected from the group of metals consisting of aluminum, carbon steel, mild steel, tool steel, stainless steel, hardened steel, and titanium.

73. The method according to claim 60 wherein said surface is aluminum.

74. The method according to claim 60 wherein said surface is carbon steel.

75. The method according to claim 60 wherein said surface is mild steel.

76. The method according to claim 60 wherein said surface is tool steel.

77. The method according to claim 60 wherein said surface is stainless steel.

78. The method according to claim 60 wherein said surface is titanium.

79. The method according to claim 60 wherein said surface is wood.

80. The method according to claim 63 wherein said surface is selected from the group of metals consisting of aluminum, carbon steel, mild steel,tool steel, stainless steel, hardened steel, and titanium.

* * * * *

UNITED STATES PATENT AND TRADEMARK OFFICE
CERTIFICATE OF CORRECTION

PATENT NO. : 7,384,438 B1
APPLICATION NO. : 09/618876
DATED : June 10, 2008
INVENTOR(S) : Anatoly Z. Rosenflanz It is certified that error appears in the above-identified patent and that said Letters Patent is hereby corrected as shown below:

Column 1
Line 1, delete "$AL_2O_3$-$Y_2O_3$-$ZRO_2$" and insert -- $Al_2O_3$-$Y_2O_3$-$ZrO_2$ --, therefor.
Line 41, delete "al.))(also" and insert -- al.)) (also --, therefor.

Column 2
Line 9, delete "(Larmnie)," and insert -- (Larmie), --, therefor.
Line 10, delete "(Larmnie)," and insert -- (Larmie), --, therefor.
Line 44, delete "stones)." and insert -- stones. --, therefor.
Line 55, delete "4,898,587." and insert -- 4,898,587 --, therefor.

Column 3
Line 13, delete "$Al_2O_3.Y_2O_3$," and insert -- $Al_2O_3 \cdot Y_2O_3$, --, therefor.
Line 15, delete "$Al_2O_3.Y_2O_3$)," and insert -- $Al_2O_3 \cdot Y_2O_3$), --, therefor.
Line 16, delete "$Al_2O_3.Y_2O_3$." and insert -- $Al_2O_3 \cdot Y_2O_3$. --, therefor.
Line 18, delete "$Al_2O_3.Y_2O_3$." and insert -- $Al_2O_3 \cdot Y_2O_3$. --, therefor.
Line 20, delete "$Al_2O_3.Y_2O_3$," and insert -- $Al_2O_3 \cdot Y_2O_3$, --, therefor.
Line 21, delete "$Al_2O_3.Y_2O_3$" and insert -- $Al_2O_3 \cdot Y_2O_3$ --, therefor.
Line 28, delete "$Al_2O_3.Y_2O_3$" and insert -- $Al_2O_3 \cdot Y_2O_3$ --, therefor.
Line 34, delete "$Al_2O_3.Y_2O_3$" arid insert -- $Al_2O_3 \cdot Y_2O_3$ --, therefor.
Line 51, delete "$Al_2O_3.metal$" and insert -- $Al_2O_3 \cdot metal$ --, therefor.
Line 56, delete "$Al_2O_3.Y_2O_3$"" and insert -- $Al_2O_3 \cdot Y_2O_3$" --, therefor.
Line 58, delete "$Y_3Al_{5O12}$" and insert -- $Y_3Al_5O_{12}$ --, therefor.
Line 59, delete "$Al_2O_3.rare$" and insert -- $Al_2O_3 \cdot rare$ --, therefor.
Line 62, delete "$Dy_3Al_{5O12}$" and insert -- $Dy_3Al_5O_{12}$ --, therefor.
Line 64, delete "$Dy_{2O3}$," and insert -- $Dy_2O_3$, --, therefor.
Line 64, delete "$Ho_2O_3$," and insert -- $HO_2O_3$, --, therefor.

Column 5
Line 45, delete "$Al_2O_3.metal$" and insert -- $Al_2O_3 \cdot metal$ --, therefor.
Line 46, delete "$Al_2O_3.metal$" and insert -- $Al_2O_3 \cdot metal$ --, therefor.
Line 49, delete "$Al_2O_3.metal$" and insert -- $Al_2O_3 \cdot metal$ --, therefor.
Line 50, delete "$Al_2O_3.metal$" and insert -- $Al_2O_3 \cdot metal$ --, therefor.
Line 52, delete "$Al_2O_3.metal$" and insert -- $Al_2O_3 \cdot metal$ --, therefor.
Line 53, delete "$Al_2O_3.metal$" and insert -- $Al_2O_3 \cdot metal$ --, therefor.
Line 56, before "oxide" delete "$Al_2O_3.metal$" and insert -- $Al_2O_3 \cdot metal$ --, therefor.
Line 56, after "complex" delete "$Al_2O_3.metal$" and insert -- $Al_2O_3 \cdot metal$ --, therefor.
Line 58, delete "$Al_2O_3.metal$" and insert -- $Al_2O_3 \cdot metal$ --, therefor.
Line 59, delete "$Al_2O_3.metal$" and insert -- $Al_2O_3 \cdot metal$ --, therefor.
Line 65, delete "$Al_2O_3.metal$" and insert -- -$Al_2O_3 \cdot metal$ --, therefor.

UNITED STATES PATENT AND TRADEMARK OFFICE
CERTIFICATE OF CORRECTION

PATENT NO. : 7,384,438 B1
APPLICATION NO. : 09/618876
DATED : June 10, 2008
INVENTOR(S) : Anatoly Z. Rosenflanz It is certified that error appears in the above-identified patent and that said Letters Patent is hereby corrected as shown below:

Column 6
Line 1, before "oxide" delete "$Al_2O_3$.metal" and insert -- $Al_2O_3$·metal --, therefor.
Line 1, after "complex" delete "$Al_2O_3$.metal" and insert -- $Al_2O_3$·metal --, therefor.
Line 4, delete "$Al_2O_3$.metal" and insert -- $Al_2O_3$·metal --, therefor.
Line 5, delete "$Al_2O_3$.metal" and insert -- $Al_2O_3$·metal --, therefor.
Line 7, delete "$Al_2O_3$.metal" and insert -- $Al_2O_3$·metal --, therefor.
Line 9, delete "$Al_2O_3$.metal" and insert -- $Al_2O_3$·metal --, therefor.
Line 11, delete "$Al_2O_3$.metal" and insert -- $Al_2O_3$·metal --, therefor.
Line 13, delete "$Al_2O_3$.metal" and insert -- $Al_2O_3$·metal --, therefor.
Line 15, delete "$Al_2O_3$.metal" and insert -- $Al_2O_3$·metal --, therefor.
Line 17, delete "$Al_2O_3$.metal" and insert -- $Al_2O_3$·metal --, therefor.
Line 44, delete "$Al_2O_3$.$Y_2O_3$," and insert -- $Al_2O_3$·$Y_2O_3$, --, therefor.
Line 47, delete "$Al_2O_3$.$Y_2O_3$" and insert -- $Al_2O_3$·$Y_2O_3$ --, therefor.
Line 50, delete "$Al_2O_3$.$Y_2O_3$." and insert -- $Al_2O_3$·$Y_2O_3$. --, therefor.

Column 7
Line 7, before "oxide" delete "$Al_2O_3$.metal" and insert -- $Al_2O_3$·metal --, therefor.
Line 7, after "complex" delete "$Y_2O_3$.metal" and insert -- $Y_2O_3$·metal --, therefor.

Column 8
Line 17, delete "$Al_2O_3$.$Y_2O_3$" and insert -- $Al_2O_3$·$Y_2O_3$ --, therefor.
Line 18, after "$ZrO_2$" insert -- phase, the --.
Line 19, delete "$Al_2O_3$.$Y_2O_3$," and insert -- $Al_2O_3$·$Y_2O_3$, --, therefor.
Line 22, delete "$Al_2O_3$.$Y_2O_3$," and insert -- $Al_2O_3$·$Y_2O_3$, --, therefor.
Line 58, delete "$Al_2O_3$.metal" and insert -- $Al_2O_3$·metal --, therefor.

Column 9
Line 2, delete "$Y_2O_3$.metal" and insert -- $Y_2O_3$·metal --, therefor.
Line 10, delete "haffnia." and insert -- hafnia. --, therefor.
Line 63, delete "other.than" and insert -- other than --, therefor.

Column 10
Line 45, before "No. 3,891,408" delete "Pat," and insert -- Pat. --, therefor.
Line 45, after "U.S." delete "Pat," and insert -- Pat. --, therefor.
Line 46, before "No. 4,070,796" delete "Pat," and insert -- Pat. --, therefor.
Line 46, after "U.S." delete "Pat," and insert -- Pat. --, therefor.
Line 47, after "U.S." delete "Pat," and insert -- Pat. --, therefor.
Line 48, before "No. 4,457,767" delete "Pat," and insert -- Pat. --, therefor.
Line 48, after "U.S." delete "Pat," and insert -- Pat. --, therefor.

UNITED STATES PATENT AND TRADEMARK OFFICE
CERTIFICATE OF CORRECTION

| | | |
|---|---|---|
| PATENT NO. | : 7,384,438 B1 | |
| APPLICATION NO. | : 09/618876 | |
| DATED | : June 10, 2008 | |
| INVENTOR(S) | : Anatoly Z. Rosenflanz | |

It is certified that error appears in the above-identified patent and that said Letters Patent is hereby corrected as shown below:

Line 53, after "include" delete "are" and insert -- arc --, therefor.
Line 53, after "furnace," delete "are" and insert -- arc --, therefor.
Line 54, delete "are" and insert -- arc --, therefor.
Line 56, delete "are"," and insert -- arc", --, therefor.

Column 11
Line 54, delete "are" and insert -- arc --, therefor.

Column 12
Line 39, delete "Pat," and insert -- Pat. --, therefor.
Line 40, delete "Pat," and insert -- Pat. --, therefor.
Line 41, before "No. 4,194,887" delete "Pat," and insert -- Pat. --, therefor.
Line.4l, after "(Ueltz et al.), U.S." delete "Pat," and insert -- Pat. --, therefor.
Line 42, delete "Pat," and insert -- Pat. --, therefor.
Line 43, delete "Pat," and insert -- Pat. --, therefor.

Column 14
Line 3, delete "JIs220," and insert -- JIS220, --, therefor.

Column 17
Line 48, delete "lonta" and insert -- Ionta --, therefor.
Line 57, delete "c," and insert -- $\alpha,\beta$ --, therefor.

Column 18
Line 33, delete "1 100°" and insert -- 1100° --, therefor.

Column 19
Line 12, delete "tetrachloronaphtalene," and insert -- tetrachloronaphthalene, --, therefor.
Line 16, delete "tetrafluoraboate," and insert -- tetrafluoraborate, --, therefor.
Line 67, delete "(Larmnie)," and insert -- (Larmie), --, therefor.

Column 20
Line 37, delete "example,." and insert -- example, --, therefor.

UNITED STATES PATENT AND TRADEMARK OFFICE
CERTIFICATE OF CORRECTION

PATENT NO. : 7,384,438 B1
APPLICATION NO. : 09/618876
DATED : June 10, 2008
INVENTOR(S) : Anatoly Z. Rosenflanz It is certified that error appears in the above-identified patent and that said Letters Patent is hereby corrected as shown below:

Column 22
Line 22, delete "are" and insert -- arc --, therefor.
Line 28, delete "are" and insert -- arc --, therefor.
Line 29, delete "are" and insert -- arc --, therefor.
Line 33, delete "are" and insert -- arc --, therefor.
Line 47, delete "EL" and insert -- IL --, therefor.

Column 24
Line 49, delete "vol" and insert -- vol. --, therefor.

Column 27
Line 24, delete "1 micrometer." and insert -- 2 micrometers. --, therefor.
Line 60, delete "Was" and insert -- was --, therefor.

Column 31
Line 51, delete "icolonies" and insert -- colonies --, therefor.
Line 56, delete "αc-" and insert -- α- --, therefor.

Column 32
Line 28, in Claim 1, delete "$Al_2O_3.Y_2O_3$." and insert -- $Al_2O_3 \cdot Y_2O_3$, --, therefor.
Line 29, in Claim 1, delete "$Al_2O_3.Y_2O_3$." and insert -- $Al_2O_3 \cdot Y_2O_3$. --, therefor.
Line 30, in Claim 2, after "1" insert -- wherein --.
Line 58, in Claim 9, delete "$Al_2O_3$.rare" and insert -- $Al_2O_3 \cdot$rare --, therefor.
Line 63, in Claim 10, delete "$Al_2O_3$.metal" and insert -- $Al_2O_3 \cdot$metal --, therefor.

Column 33
Line 2, in Claim 12, delete "ar" and insert -- at --, therefor.
Line 3, in Claim 12, delete "$Al_2O_3.Y_2O_3$or" and insert -- $Al_2O_3 \cdot Y_2O_3$ or --, therefor.
Line 4, in Claim 12, delete "$Al_2O_3.Y_2O_3$" and insert -- $Al_2O_3 \cdot Y_2O_3$ --, therefor.
Line 17, in Claim 13, delete "$Al_2O_3.Y_2O_3$" and insert -- $Al_2O_3 \cdot Y_2O_3$ --, therefor.
Line 18, in Claim 13, delete "$Al_2O_3.Y_2O_3$," and insert -- $Al_2O_3 \cdot Y_2O_3$, --, therefor.
Line 27, in Claim 13, delete "$Al_2O_3. Y_2O_3$" and insert -- $Al_2O_3 \cdot Y_2O_3$ --, therefor.
Line 28, in Claim 13, delete "$Al_2O_3.Y_2O_3$" and insert -- $Al_2O_3 \cdot Y_2O_3$ --, therefor.
Line 37, in Claim 14, delete "cutectic" and insert -- eutectic --, therefor.
Line 40, in Claim 14, delete "$Al_2O_3.Y_2O_3$,"and insert -- $Al_2O_3 \cdot Y_2O_3$, --, therefor.
Line 41, in Claim 14, delete "$Al_2O_3.Y_2O_3$," and insert -- $Al_2O_3 \cdot Y_2O_3$, --, therefor.
Line 51, in Claim 14, delete "$Al_2O_3.Y_2O_3$" and insert -- $Al_2O_3 \cdot Y_2O_3$ --, therefor.
Line 52, in Claim 14, delete "$Al_2O_3.Y_2O_3$" and insert -- $Al_2O_3 \cdot Y_2O_3$ --, therefor.
Line 65, in Claim 15, delete "$Al_2O_3.Y_2O_3$," and insert -- $Al_2O_3 \cdot Y_2O_3$, --, therefor.

UNITED STATES PATENT AND TRADEMARK OFFICE
CERTIFICATE OF CORRECTION

| | | |
|---|---|---|
| PATENT NO. | : 7,384,438 B1 | |
| APPLICATION NO. | : 09/618876 | |
| DATED | : June 10, 2008 | |
| INVENTOR(S) | : Anatoly Z. Rosenflanz | |

It is certified that error appears in the above-identified patent and that said Letters Patent is hereby corrected as shown below:

Line 66, in Claim 15, delete "$Al_2O_3.Y_2O_3$," and insert -- $Al_2O_3 \cdot Y_2O_3$, --, therefor.
Line 67, in Claim 15, after "fused" insert -- , --.

Column 34
Line 8, in Claim 15, delete "$Al_2O_3.Y_2O_3$" and insert -- $Al_2O_3 \cdot Y_2O_3$ --, therefor.
Line 9, in Claim 15, delete "$Al_2O_3.Y_2O_3$" and insert -- $Al_2O_3 \cdot Y_2O_3$ --, therefor.
Line 18, in Claim 17, delete "$Al_2O_3.Y_2O_3$." and insert -- $Al_2O_3 \cdot Y_2O_3$. --, therefor.
Line 36, in Claim 21 .delete "$Al_2O_3$.metal" and insert -- $Al_2O_3 \cdot$metal --, therefor.
Line 43, in Claim 23, delete "$Al_2O_3.Y_2O_3$," and insert -- $Al_2O_3 \cdot Y_2O_3$, --, therefor.
Line 44, in Claim 23, delete "$Al_2O_3.Y_2O_3$." and insert -- $Al_2O_3 \cdot Y_2O_3$. --, therefor.
Line 62, in Claim 27, delete "$Al_2O_3$.metal" and insert -- $Al_2O_3 \cdot$metal --, therefor.

Column 35
Line 8, in Claim 29, delete "$Al_2O_3.Y_2O_3$" and insert -- $Al_2O_3 \cdot Y_2O_3$ --, therefor.
Line 25, in Claim 33, after "comprise" delete "comprises".
Line 28, in Claim 33, delete "$Al_2O_3$metal" and insert -- $Al_2O_3 \cdot$metal --, therefor.
Line 42, in Claim 37, delete "$Al_2O_3.Y_2O_3$," and insert -- $Al_2O_3 \cdot Y_2O_3$, --, therefor.
Line 43, in Claim 37, delete "$Al_2O_3.Y_2O_3$," and insert -- $Al_2O_3 \cdot Y_2O_3$, --, therefor.
Line 67, in Claim 41, delete "$Al_2O_3.Y_2O_3$." and insert -- $Al_2O_3 \cdot Y_2O_3$. --, therefor.

Column 36
Line 3, in Claim 42, delete "$Al_2O_3.Y_2O_3$," and insert -- $Al_2O_3 \cdot Y_2O_3$, --, therefor.
Line 4, in Claim 42, delete "$Al_2O_3.Y_2O_3$." and insert -- $Al_2O_3 \cdot Y_2O_3$. --, therefor.
Line 9, in Claim 43, delete "$Al_2O_3.Y_2O_3$" and insert -- $Al_2O_3 \cdot Y_2O_3$ --, therefor.
Line 31, in Claim 44, delete "$Al_2O_3.Y_2O_3$," and insert -- $Al_2O_3 \cdot Y_2O_3$, --, therefor.
Line 32, in Claim 44, delete "$Al_2O_3.Y_2O_3$." and insert -- $Al_2O_3 \cdot Y_2O_3$. --, therefor.
Line 43, in Claim 48, delete "$Al_2O_3.Y_2O_3$." and insert -- $Al_2O_3 \cdot Y_2O_3$. --, therefor.
Line 46, in Claim 49, delete "$Al_2O_3.Y_2O_3$," and insert -- $Al_2O_3 \cdot Y_2O_3$, --, therefor.
Line 47, in Claim 49, delete "$Al_2O_3.Y_2O_3$"and insert -- $Al_2O_3 \cdot Y_2O_3$. --, therefor.
Line 53, in Claim 50, delete "$Al_2O_3.Y_2O_3$" and insert -- $Al_2O_3 \cdot Y_2O_3$ --, therefor.

Column 37
Line 1, in Claim 52, delete "$Al_2O_3.Y_2O_3$," and insert -- $Al_2O_3 \cdot Y_2O_3$, --, therefor.
Line 2, in Claim 52, delete "$Al_2O_3.Y_2O_3$." and insert -- $Al_2O_3 \cdot Y_2O_3$. --, therefor.
Line 14, in Claim 56, delete "$Al_2O_3.Y_2O_3$." and insert -- $Al_2O_3 \cdot Y_2O_3$. --, therefor.
Line 17, in Claim 57, delete "$Al_2O_3.Y_2O_3$," and insert -- $Al_2O_3 \cdot Y_2O_3$, --, therefor.
Line 18, in Claim 57, delete "$Al_2O_3.Y_2O_3$." and insert -- $Al_2O_3 \cdot Y_2O_3$. --, therefor.
Line 26, in Claim 58, delete "$Al_2O_3.Y_2O_3$" and insert -- $Al_2O_3 \cdot Y_2O_3$ --, therefor.
Line 37, in Claim 60, delete "reselective" and insert -- respective --, therefor.

UNITED STATES PATENT AND TRADEMARK OFFICE
CERTIFICATE OF CORRECTION

PATENT NO. : 7,384,438 B1
APPLICATION NO. : 09/618876
DATED : June 10, 2008
INVENTOR(S) : Anatoly Z. Rosenflanz It is certified that error appears in the above-identified patent and that said Letters Patent is hereby corrected as shown below:

Line 41, in Claim 60, delete "$Al_2O_3.Y_2O_3$," and insert -- $Al_2O_3·Y_2O_3$, --, therefor.
Line 42, in Claim 60, delete "$Al_2O_3.Y_2O_3$;" and insert -- $Al_2O_3·Y_2O_3$; --, therefor.
Line 45, in Claim 60, delete "fired" and insert -- fused --, therefor.
Line 51, in Claim 61, delete "$Al_2O_3.Y_2O_3$." and insert -- $Al_2O_3·Y_2O_3$. --, therefor.
Line 54, in Claim 62, delete "$Al_2O_3.Y_2O_3$," and insert -- $Al_2O_3·Y_2O_3$, --, therefor.
Line 55, in Claim 62, delete "$Al_2O_3.Y_2O_3$." and insert -- $Al_2O_3·Y_2O_3$. --, therefor.
Line 64, in Claim 63, delete "cutectic" and insert -- eutectic --, therefor.
Line 65, in Claim 63, delete "$Al_2O_3.Y_2O_3$" and insert -- $Al_2O_3·Y_2O_3$ --, therefor.

Column 38
Line 6, in Claim 64, before "is eutectic" insert -- further comprises
    crystalline $Al_2O_3$ such that said eutectic --.
Line 7, in Claim 64, delete "$Al_2O_3.Y_2O_3$." and insert -- $Al_2O_3·Y_2O_3$. --, therefor.
Line 10, in Claim 65, delete "$Al_2O_3.Y_2O_3$," and insert -- $Al_2O_3·Y_2O_3$, --, therefor.
Line 11, in Claim 65, delete "$Al_2O_3.Y_2O_3$." and insert -- $Al_2O_3·Y_2O_3$. --, therefor.
Line 28, in Claim 68, delete "JS8000," and insert -- JIS8000, --, therefor.
Line 43, in Claim 71, delete "JIS100," and insert -- JIS1000, --, therefor.
Line 64, in Claim 80, delete "steel,tool steel," and insert -- steel tool, steel, --, therefor.

Signed and Sealed this

Seventeenth Day of March, 2009

JOHN DOLL
*Acting Director of the United States Patent and Trademark Office*